(12) United States Patent
Fisher

(10) Patent No.: US 7,128,191 B2
(45) Date of Patent: Oct. 31, 2006

(54) ACTUATOR ASSEMBLY

(75) Inventor: Sidney Edward Fisher, Redditch (GB)

(73) Assignee: ArvinMeritor Light Vehicle Systems (UK) Ltd., Stirchley (GB)

( * ) Notice: Subject to any disclaimer, the term of this patent is extended or adjusted under 35 U.S.C. 154(b) by 0 days.

(21) Appl. No.: 10/970,694

(22) Filed: Oct. 21, 2004

(65) Prior Publication Data

US 2005/0115348 A1 Jun. 2, 2005

(30) Foreign Application Priority Data

Oct. 22, 2003 (GB) ................. 0324576.8

(51) Int. Cl.
*F16D 69/00* (2006.01)

(52) U.S. Cl. .................. 188/265; 267/26; 267/275; 267/284; 267/285; 267/155

(58) Field of Classification Search ............... 188/265; 267/26, 273, 275, 284, 285, 154, 155
See application file for complete search history.

(56) References Cited

U.S. PATENT DOCUMENTS

| | | | |
|---|---|---|---|
| 2,192,101 A | | 2/1940 | Peskin |
| 4,290,634 A | | 9/1981 | Gelhard |
| 4,624,491 A | | 11/1986 | Vincent |
| 4,779,912 A | * | 10/1988 | Ikeda et al. ............. 292/336.3 |
| 4,821,521 A | * | 4/1989 | Schuler .................. 60/716 |
| 5,004,077 A | * | 4/1991 | Carlson et al. .......... 188/2 D |
| 5,079,964 A | | 1/1992 | Hamada et al. |
| 5,370,586 A | * | 12/1994 | Thomsen et al. .......... 474/135 |
| 6,015,142 A | * | 1/2000 | Ulicny ................. 267/154 |
| 2002/0096889 A1 | * | 7/2002 | Nelsen et al. ............ 292/201 |

FOREIGN PATENT DOCUMENTS

| | | |
|---|---|---|
| EP | 267423 | 5/1988 |
| FR | 384 918 | 4/1906 |
| FR | 2 525 308 | 10/1983 |
| GB | 498391 | 1/1939 |
| GB | 626460 | 6/1949 |
| GB | 2262769 | 6/1993 |

OTHER PUBLICATIONS

Partial European Search Report dated Feb. 23, 2005.
United Kingdom Search Report dated Apr. 20, 2004.
Partial European Search Report dated Dec. 21, 2005.

* cited by examiner

*Primary Examiner*—Devon Kramer
(74) *Attorney, Agent, or Firm*—Carlson, Gaskey & Olds

(57) ABSTRACT

An actuator assembly includes an actuator, an output member, and a spring arrangement having at least one spiral return spring. The output member has a neutral position, a first actuated position, and a second actuated position. The neutral position is between the first actuated position and the second actuated position. The output member capable of being driven by the actuator from the neutral position to the first actuated position and to the second actuated position. The spring arrangement is arranged to bias the output member towards the neutral position from the first actuated position and is arranged to bias the output member towards the neutral position from the second actuated position.

16 Claims, 23 Drawing Sheets

ACTUATOR ASSEMBLY

REFERENCE TO RELATED APPLICATION

This application claims priority to United Kingdom Patent Application GB 0324576.8 filed on Oct. 22, 2003.

BACKGROUND OF THE INVENTION

The present invention relates generally to actuator assemblies, and more particularly to actuator assemblies for use with latches in vehicle doors and other closures.

A known vehicle door latch actuator assembly includes an actuator in the form of an electric motor that moves components of a latch from a neutral position to a locked position and an unlocked position.

After the electric motor has moved the latch to the locked position or the unlocked position, the electric motor is powered in the opposite direction to return to the neutral position. When the latch is manually locked or unlocked by, for example, using a key or a sill button, it is not necessary to manually drive the electric motor back to the neutral position, reducing the effort required.

Known vehicle door latch actuator assemblies include a return mechanism employing a helical spring, as shown in European Patent Application EP0267423.

As the electric motor drives in one direction, one end of the helical spring rotates about a longitudinal axis relative to the other end, leaving the helical spring in a torsionally loaded state. When power to the electric motor stops, the helical spring torsionally unwinds to bias the electric motor back towards the neutral position. Therefore, the electric motor does not need to be driven in the opposite direction.

In its simplest form, a helical spring is a spring that is formed by winding wire into a helix along a curved outer surface of an imaginary cylinder. A base of the imaginary cylinder forms a radial plane that, at one end of the spring, lies at 90 degrees to the central elongate (longitudinal) axis of the spring. A coil of the spring is a loop of wire that completes a 360 degree circumnavigation of the imaginary cylinder, and no two points along any given coil exist in any single plane that lies parallel to the radial plane. FIG. 14 of U.S. Pat. No. 4,779,912 shows an example of a helical spring. The elongate axis may also be curved, i.e., where the spring is wound on part of an imaginary torus rather than being wound on an imaginary cylinder.

Further, helical springs are to be distinguished from conical springs, which are distinct from helical springs in that they are formed by winding wire into a helix along the outer curved surface of a cone. FIG. 3 of U.S. Pat. No. 4,821,521 shows an example of a conical spring. Typically, helical and conical springs are used to provide either a compressive force or a tensile force, in other words, to act in an axial manner. However, it is also possible to employ each of these types of spring to provide a torsional bias.

It will be appreciated that helical springs and conical springs are distinct from spiral springs, which will be described in further detail shortly.

A problem with known return mechanisms including helical springs is that, when loaded, there is a tendency for the stress to concentrate in one area of the helical spring, thereby reducing the fatigue life and possibly resulting in the failure of the return mechanism.

The present invention provides an actuator assembly with an increased fatigue life.

SUMMARY OF INVENTION

According to one embodiment of the present invention, an actuator assembly includes an actuator, an output member, and a spring arrangement having at least one spiral return spring. The output member has a neutral position, a first actuated position, and a second actuated position. The neutral position is between the first actuated position and the second actuated position. Further, the output member is capable of being driven by the actuator from the neutral position to the first actuated position and to the second actuated position. The spring arrangement is arranged to bias the output member towards the neutral position from the first actuated position and to bias the output member towards the neutral position from the second actuated position.

According to another embodiment of the present invention, an output member subassembly includes an output member and a spring arrangement having at least one spiral return spring. The output member has a neutral position, a first actuated position, and a second actuated position. The neutral position is between the first actuated position and the second actuated position. Further, the output member is capable of being driven by an actuator from the neutral position to the first actuated position and to the second actuated position. The spring arrangement is arranged to bias the output member towards the neutral position from the first actuated position and to bias the output member towards the neutral position from the second actuated position.

A spiral spring can be a conical spring that has been compressed in the axial direction so that the coils lie within each other. In other words, the spiral spring is a spring formed by winding a strip of metal initially onto a cylinder, and successive coils are laid onto the previous coil. Because all of the coils lie in the same plane, the spring can only provide a relatively small amount of axial bias. Therefore, the purpose of the spiral spring is to provide a torsional resistance, rather than an axial resistance, offered by either a helical spring or a conical spring.

By using a spiral return spring rather than a helical return spring, the stress associated with winding and unwinding the spiral return spring is more evenly distributed through the spring, increasing fatigue life.

According to yet another embodiment of the present invention, a method of assembling an actuator assembly includes the steps of providing an actuator, an output member, a spring arrangement and a chassis. The method further includes the steps of assembling the spring arrangement onto the output member to provide an output member subassembly, assembling the output member subassembly onto the chassis such that the spring arrangement is in the neutral position, and assembling the actuator onto the chassis.

Because the spring arrangement is mounted on the output member to provide a subassembly prior to mounting the subsequently onto the chassis, the potentially complex stage of locating the spring arrangement can be conducted remotely from the chassis, thus increasing the efficiency of the assembly process.

According to yet another embodiment of the present invention, a combined spring includes a first spiral return spring and a second spiral return spring that is integral with the first spiral return spring. The first spiral return spring of the combined spring is wound in a first direction, and the second spiral return spring of the combined spring is wound in a second direction opposite to the first direction.

These and other features of the present invention will be best understood from the following specification and drawings.

BRIEF DESCRIPTION OF THE DRAWINGS

The invention will now be described by way of example with reference to the accompanying drawings, in which.

DETAILED DESCRIPTION OF THE PREFERRED EMBODIMENT

Figure 1:
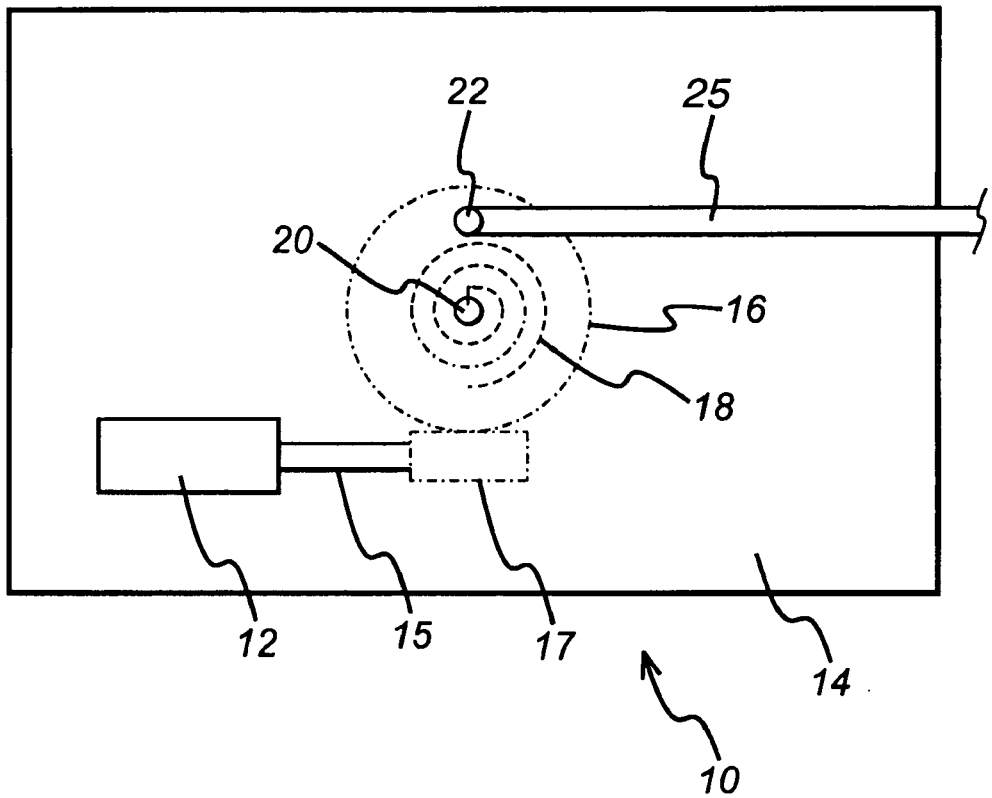
FIG. 1 is a plan view of an actuator assembly according to a first embodiment of the present invention.

As illustrated in FIG. 1, an actuator assembly 10 includes an actuator in the form of an electric motor 12, a chassis 14, an output member in the form of a gear wheel 16, and a spiral return spring 18 (shown hidden in FIG. 1).

A spiral spring is a spring that is wound in substantially one plane and has coils of decreasing diameter, as opposed to a helical spring that has coils of a constant diameter extending in another plane. Typically, a spiral spring is wound from wire having a substantially rectangular cross-sectional profile, and a helical spring is wound from wire having a substantially round cross-sectional profile.

The gear wheel 16 is rotationally mounted on the chassis 14 at a pivot pin 20 and includes an output in the form of a pin 22 mounted thereon that is connected to a linkage 25. The linkage 25 is connected to a device (not shown in FIG. 1) that requires actuation.

The electric motor 12 is drivingly connected to the gear wheel 16 by a worm gear 17. The worm gear 17 is mounted rotationally fast on an electric motor shaft 15 and engages the gear wheel 16 via gear teeth (not shown). The electric motor shaft 15 and the worm gear 17 form a transmission path between the electric motor 12 and the gear wheel 16 such that actuation of the electric motor 12 causes the gear wheel 16 to rotate about the pivot pin 20.

Figure 2:
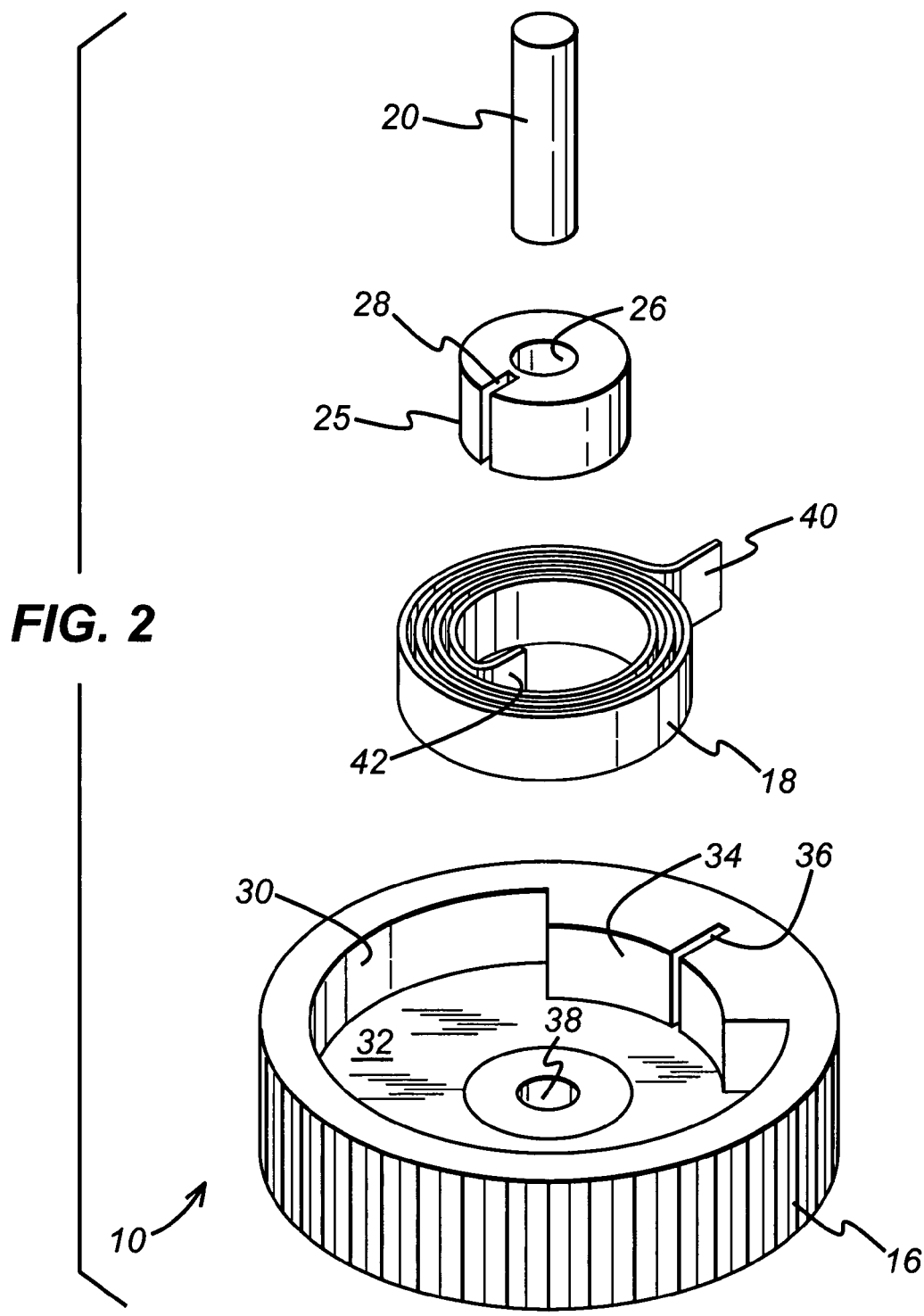
FIG. 2 is an exploded perspective view of part of the actuator assembly illustrated in FIG. 1 in a neutral position.

FIG. 2 shows components of part of the actuator assembly 10 in more detail. The actuator assembly 10 further includes a round spigot 24 mounted on and integral with the chassis 14, i.e., rotationally fast with the chassis 14. The round spigot 24 includes a through hole 26 and a spigot slot 28 extending from its periphery towards the through hole 26. The pivot pin 20 extends through the through hole 26 of the round spigot 24 and is mounted on and is rotationally fast with the chassis 14.

The gear wheel 16 has an outer wall 30 that defines a recess 32, and the recess 32 includes a hole 38. The outer wall 30 includes a portion 34 having a thickness greater than the thickness of the remainder of the outer wall 30, and the portion 34 includes a drive slot 36.

The spiral return spring 18 has an outer arm 40 and an inner arm 42. The spiral return spring 18 in shown in a free state, and the inner arm 42 and the outer arm 40 are substantially aligned.

Figure 3:
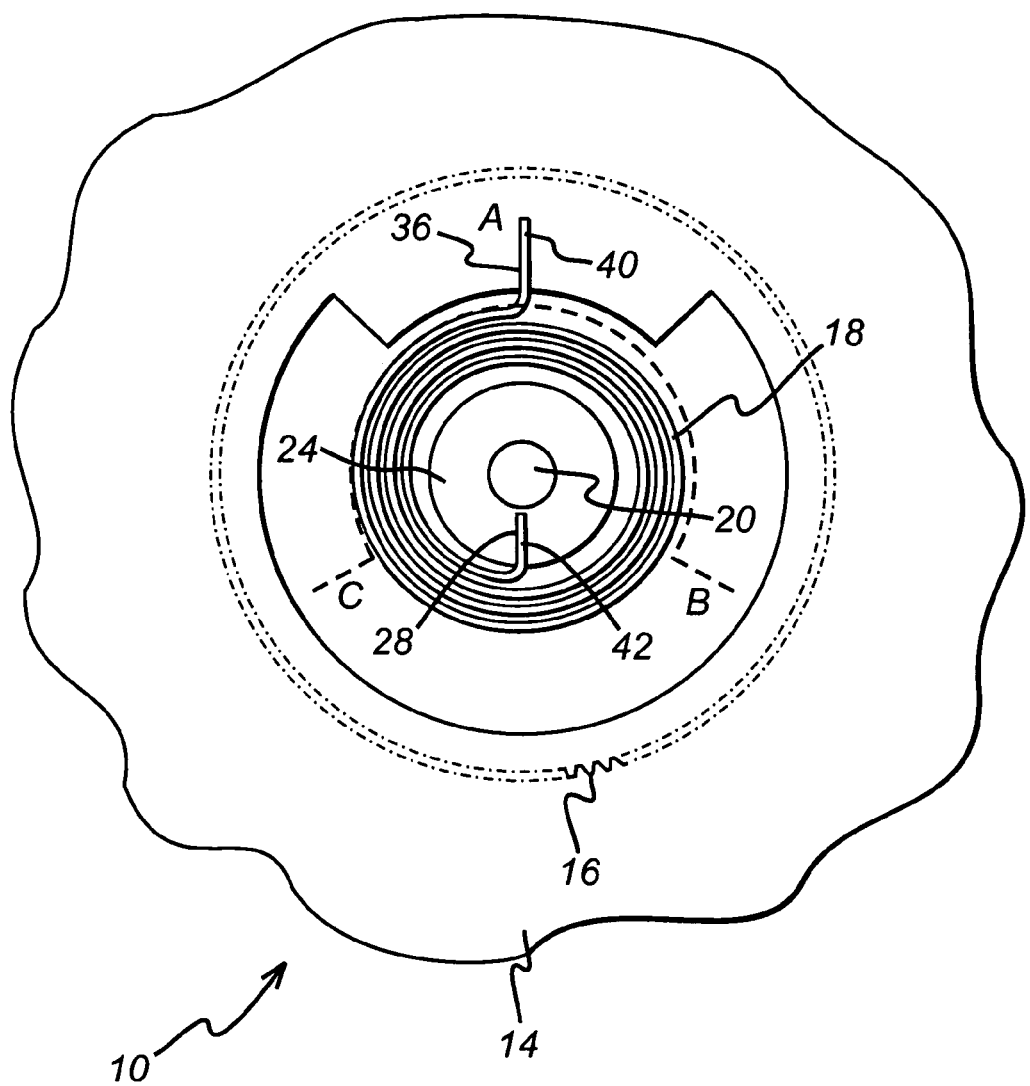
FIG. 3 is a plan view of part of the actuator assembly illustrated in FIG. 1 after assembly.

FIG. 3 shows the actuator assembly 10 after it has been assembled. First, the spiral return spring 18 is assembled onto the gear wheel 16, and the outer arm 40 of the spiral return spring 18 is located in the drive slot 36. The gear wheel 16 is then mounted on the chassis 14 by mounting the gear wheel 16 and the spiral return spring 18 onto the round spigot 24 and the pivot pin 20 so that the hole 38 is mounted on the pivot pin 20, at the same time locating the inner arm 42 of the spiral return spring 18 in the spigot slot 28.

The actuator assembly 10 is shown in a neutral position. The inner arms 42 and the outer arms 40 of the spiral return spring 18 are still in alignment, and thus the spiral return spring 18 is still in its free state once it is assembled onto the chassis 14, i.e., the spiral return spring 18 is not pre-tensioned. Thus, the actuator assembly 10 has no pre-tensioning.

Operation of the actuator assembly 10 is as follows. FIG. 3 shows the actuator assembly 10 in a neutral position A. When actuation is required, an electrical current is supplied to the electric motor 12, rotating the gear wheel 16 in a first direction (clockwise when viewing FIG. 3) about the pivot pin 20 towards a first actuated position B. Typically, the neutral position A and the first actuated position B are separated by approximately 120 degrees. As the gear wheel 16 rotates in the first direction, the outer arm 40 of the spiral return spring 18 moves because it is located in the drive slot 36 of the gear wheel 16. The inner arm 42 of the spiral return spring 18 is located in the spigot slot 28, and therefore the inner arm 42 does not move (because the round spigot 24 is mounted on the chassis 14). As the gear wheel 16 rotates in the first direction, the spiral return spring 18 winds up as the outer arm 40 moves towards the inner arm 42.

Once the gear wheel 16 has been actuated to the first actuated position B, power to the electric motor 12 is stopped. This can be achieved, for example, by powering the electric motor 12 only for a predetermined period of time and including a stop feature (not shown) on the actuator assembly 10, by activating a switch (not shown) which cuts the power, or by using a stepper motor.

With the gear wheel 16 in the first actuated position B, the outer arm 40 of the spiral return spring 18 acts upon the drive slot 36 to bias the gear wheel 16 back towards the neutral position A. The gear wheel 16 will remain in the neutral position B until the gear wheel 16 is actuated again. After actuation to the first actuated position B, the gear wheel 16 is biased towards the neutral position A by the spiral return spring 18.

The electric motor 12 can also drive the gear wheel 16 in a second direction (counter-clockwise when viewing FIG. 3) towards a second actuated position C. Operation of the actuator assembly 10 in the second direction is identical to that in the first direction, except the spiral return spring 18 is unwound when being driven in the second direction by the electric motor 12. Nevertheless, the gear wheel 16 is still biased towards the neutral position A when the gear wheel 16 is at the second actuated position C. It can also be seen from FIG. 3 that the neutral position A lies between the first actuated position B and the second actuated position C.

Further, rotation of the gear wheel 16 in either the first or second direction causes the linkage 25 to move and the device (not shown) to which it is connected to move.

Figure 4:
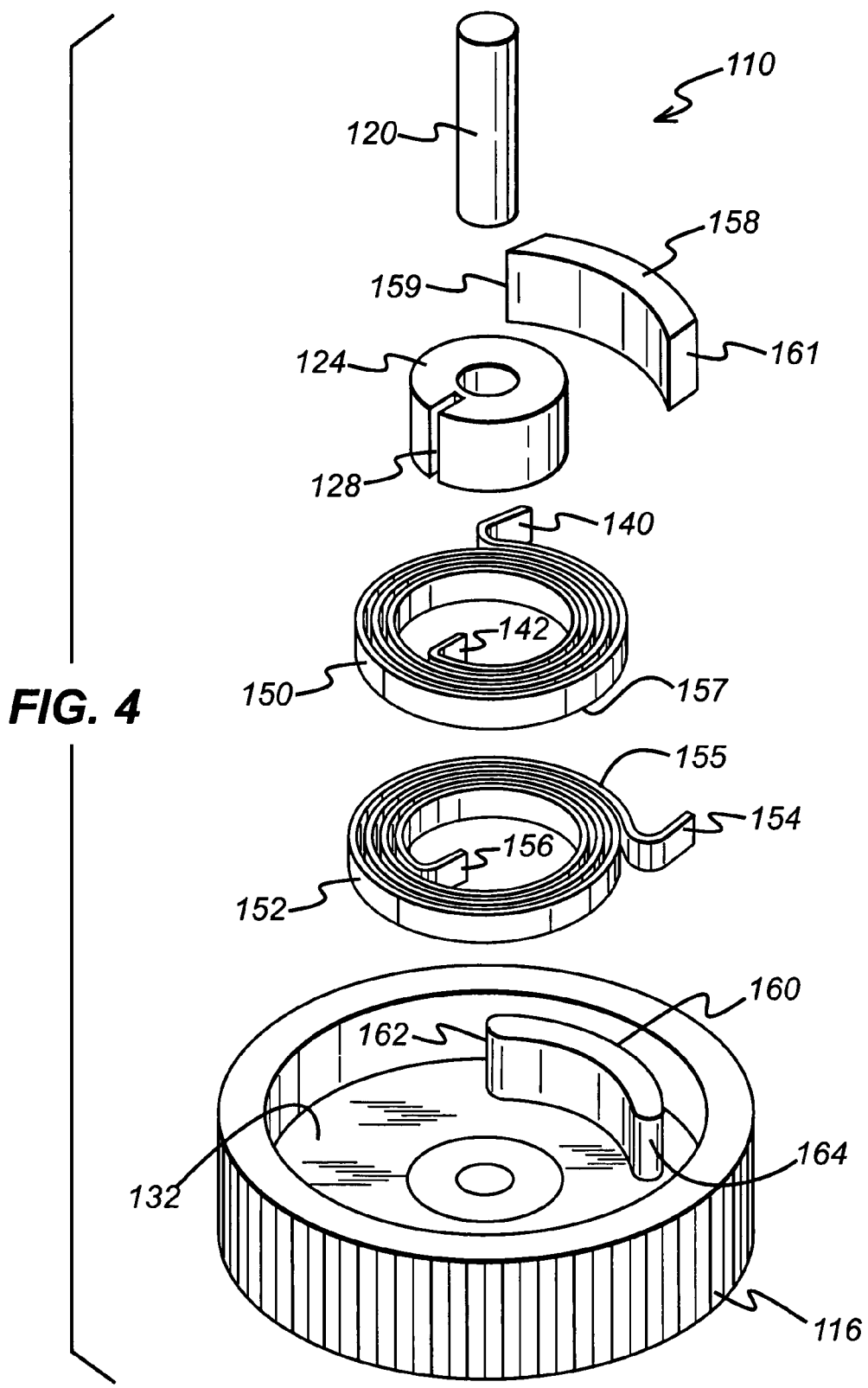
FIG. 4 is an exploded perspective view of part of an actuator assembly according to a second embodiment of the present invention in a neutral position.
Figure 5:
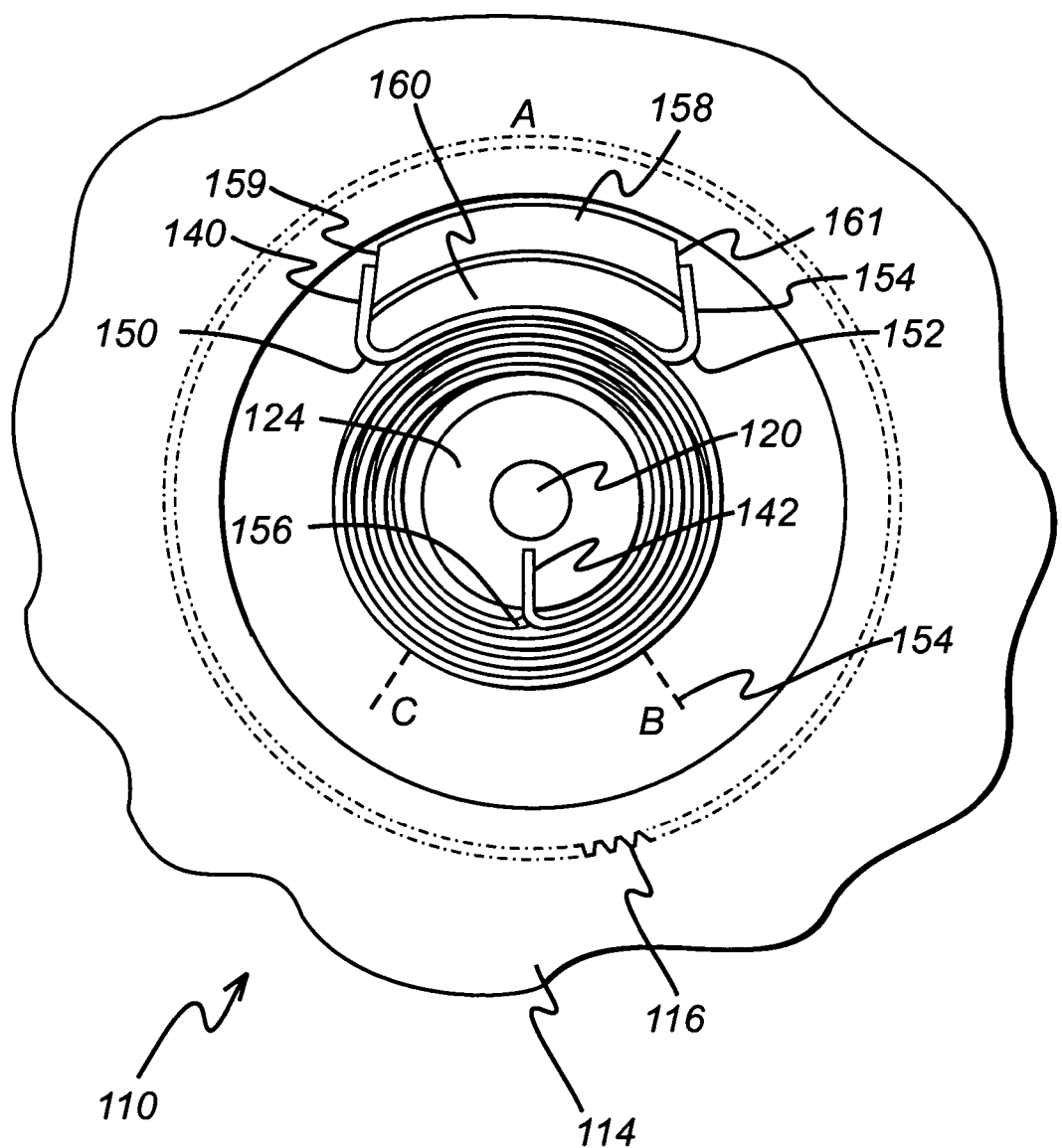
FIG. 5 is a plan view of part of the actuator assembly illustrated in FIG. 4 after assembly.

FIGS. 4 and 5 illustrate part of the actuator assembly 110 according to a second embodiment of the present invention with features identical or similar to the actuator assembly 10 numbered 100 greater.

The second embodiment includes two spiral return springs 150 and 152 as opposed to the one spiral return spring 18 of the first embodiment.

The actuator assembly 110 includes a first spiral return spring 152 having an outer arm 154 and an inner arm 156 and a second spiral return spring 150 having an outer arm 140 and an inner arm 142. The first spiral return spring 152 and the second spiral return spring 150 are identical (though one is mounted upside down relative to the other). The first spiral return spring 152 has an upper surface 155 and the second spiral return spring 150 has a lower surface 157. The first spiral return spring 152 and the second spiral return spring 150 are shown in a free state.

The actuator assembly 110 further includes a stop 158 mounted on and integral with a chassis 114. The stop has a first end 159 and a second end 161.

A gear wheel 116 includes a drive formation 160 mounted within a recess 132. The drive formation 160 has a first end 162 and a second end 164.

FIG. 5 shows the actuator assembly 110 after it has been assembled as follows. The first spiral return spring 152 and the second spiral return spring 150 are assembled onto the chassis 114 such that the outer arm 154 of the first spiral return spring 152 abuts the second end 161 of the stop 158, and the outer arm 140 of the second spiral return spring 150 abuts the first end 159 of the stop 158. The inner arm 156 of the first spiral return spring 152 and the inner arm 142 of the second spiral return spring 150 locate in the spigot slot 128 of a spigot 124. While the first spiral return spring 152 and second spiral return spring 150 are identical, they are assembled onto the chassis 114 such that they are wound in opposite directions relative to each other by simply turning one of them upside down.

The gear wheel 116 is then positioned on a pivot pin 120 such that the outer arm 154 of the first spiral return spring 152 abuts the second end 164 of the drive formation 160, and the outer arm 140 of the second spiral return spring 150 abuts the first end 162 of the drive formation 160.

As illustrated in FIG. 5, the actuator assembly 110 is in a neutral position A. As with the actuator assembly 10, the inner arms 142 and 156 and the outer arms 140 and 154 of the spiral return springs 150 and 152 are still in their same relative positions. Thus, the spiral return springs 150 and 152, respectively, are still in their free state once assembled onto the chassis 114, i.e., the spiral return springs 150 and 152 are not pre-tensioned. Thus the actuator assembly 110 can also be said to have no pre-tensioning.

As illustrated in both FIGS. 4 and 5, the lower surface 157 of the second spiral return spring 150 is proximate to the upper surface 155 of the first spiral return spring 152. Because the spiral return springs 150 and 152 are oppositely wound once assembled, the spring coils are less likely to become entwined if they contact.

In an alternative embodiment, a plastic washer (not shown) can be positioned between the first spiral return spring 152 and the second spiral return spring 150 to eliminate the possibility of contact and therefore reduce the possibility of the spiral return springs 150 and 152 becoming entwined.

Operation of the actuator assembly 110 is as follows. FIG. 5 shows the actuator assembly 110 in a neutral position A. As the gear wheel 116 is rotated in a first direction (clockwise when viewing FIG. 5) by the electric motor (not shown), the second end 164 of the drive formation 160 abuts against the outer arm 154 of the first spiral return spring 152 to move the outer arm 154. The inner arm 156 of the first spiral return spring 152 does not move because it is located in a spigot slot 128, and the spigot 124 is integral with the chassis 114. As the gear wheel 116 is rotated in the first direction, the first spiral return spring 152 winds up as the outer arm 154 moves clockwise relative to the inner arm 156. In this embodiment, the first spiral return spring 152 is wound up due to the rotation of the drive formation 160 relative to the chassis 114.

With the first spiral return spring 152 in a first actuated position B, the outer arm 154 of the first spiral return spring 152 acts upon the second end 164 of the drive formation 160 to bias the gear wheel 116 counter-clockwise back towards the neutral position A. After actuation to the first actuated position B, the gear wheel 116 is biased towards the neutral position A by the first spiral return spring 152.

As the gear wheel 116 is rotated in the first direction, the outer arm 140 of the second spiral return spring 150 remains stationary as the first end 162 of the drive formation 160 moves away from it. The outer arm 140 abuts the first end 159 of the stop 158, which does not move because it is integral with the chassis 114. As with the first spiral return spring 152, the inner arm 142 of the second spiral return spring 150 does not move because it is located in the spigot slot 128 and the spigot 124 is integral with the chassis 114. As the gear wheel 116 is rotated clockwise, neither of the arms 140 and 142 of the second spiral return spring 150 move, and thus the second spiral return spring 150 is not unwound as the first spiral return spring 152 is wound. Therefore, the actuator assembly 110 does not have to work against the second spiral return spring 150 when driving the actuator assembly 110 in the first direction. When the gear wheel 116 is rotated in the first direction, the second spiral return spring 150 is idle.

The electric motor (not shown) can also drive the gear wheel 116 in a second direction (counter-clockwise when viewing FIG. 5) towards a second actuated position C. Operation of the actuator assembly 110 in the second direction is identical to that in the first direction except that the second spiral return spring 150 biases the gear wheel 116 towards the neutral position A from the second actuated position C. Similarly, the first spiral return spring 152 is not unwound as the second spiral return spring 150 winds up, and the first spiral return spring 152 is idle.

Figure 6:
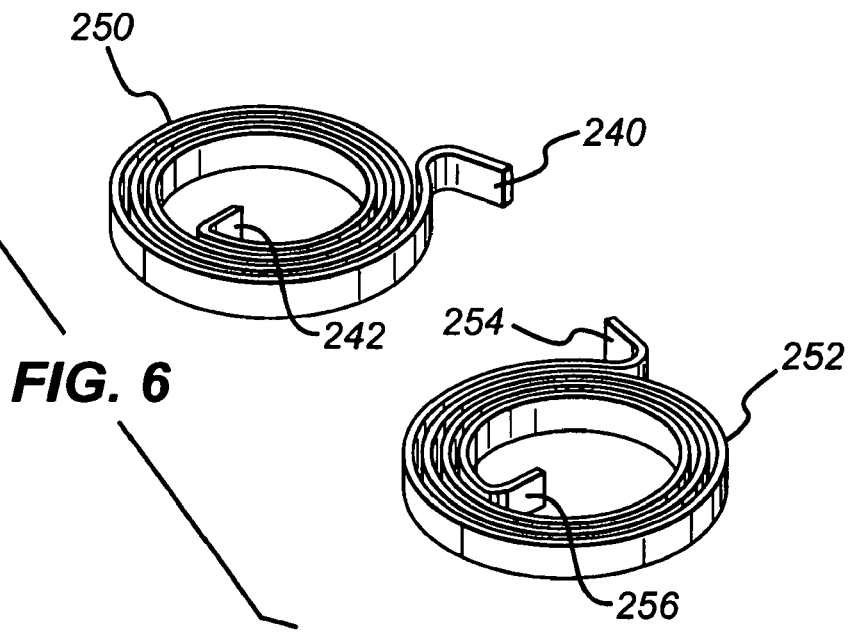
FIG. 6 is an exploded perspective view of a first spiral return spring and a second spiral return spring of an actuator assembly according to a third embodiment of the present invention in a free state.
Figure 7:
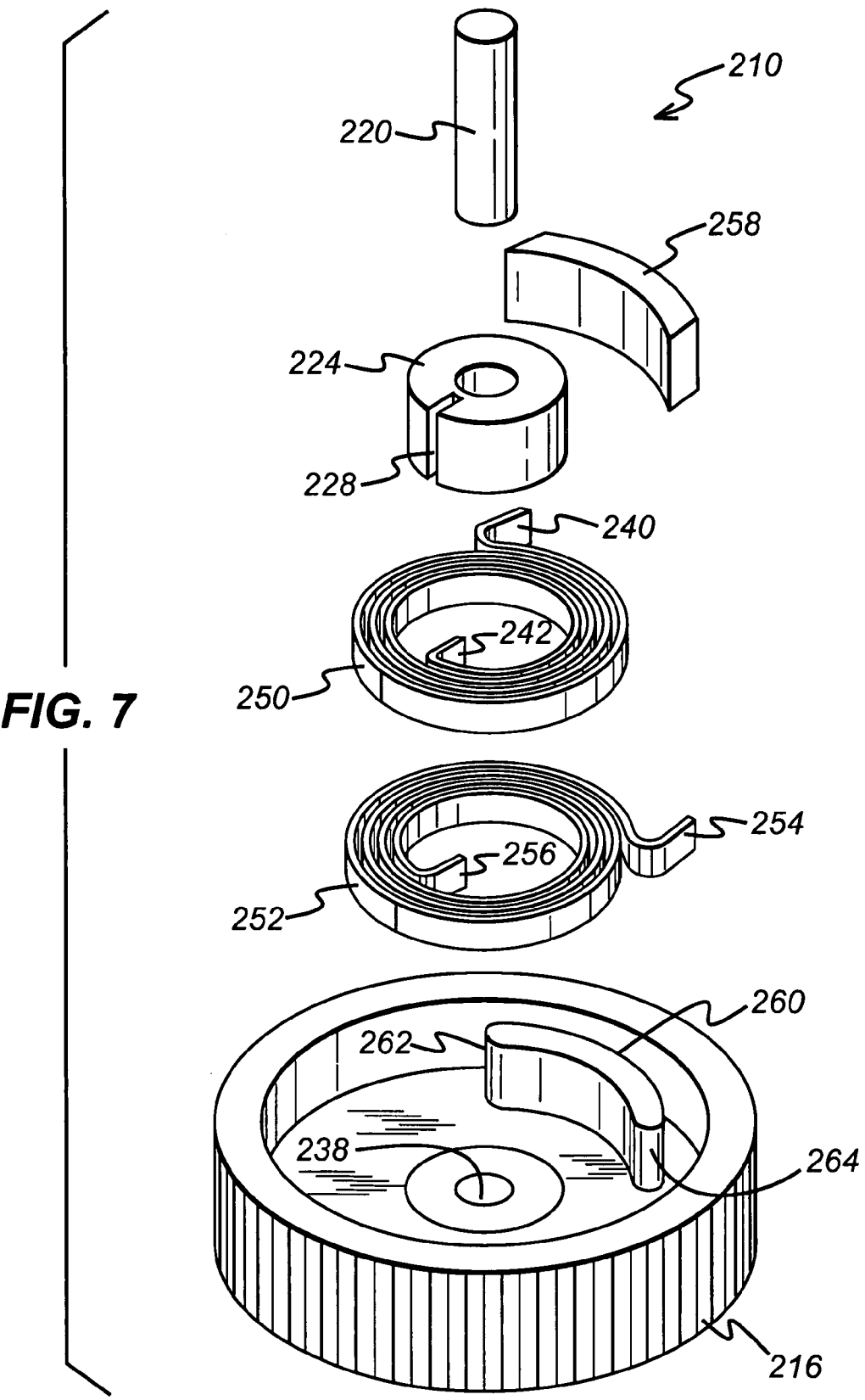
FIG. 7 is an exploded perspective view of part of the actuator assembly illustrated in FIG. 6 in a neutral position.
Figure 8:
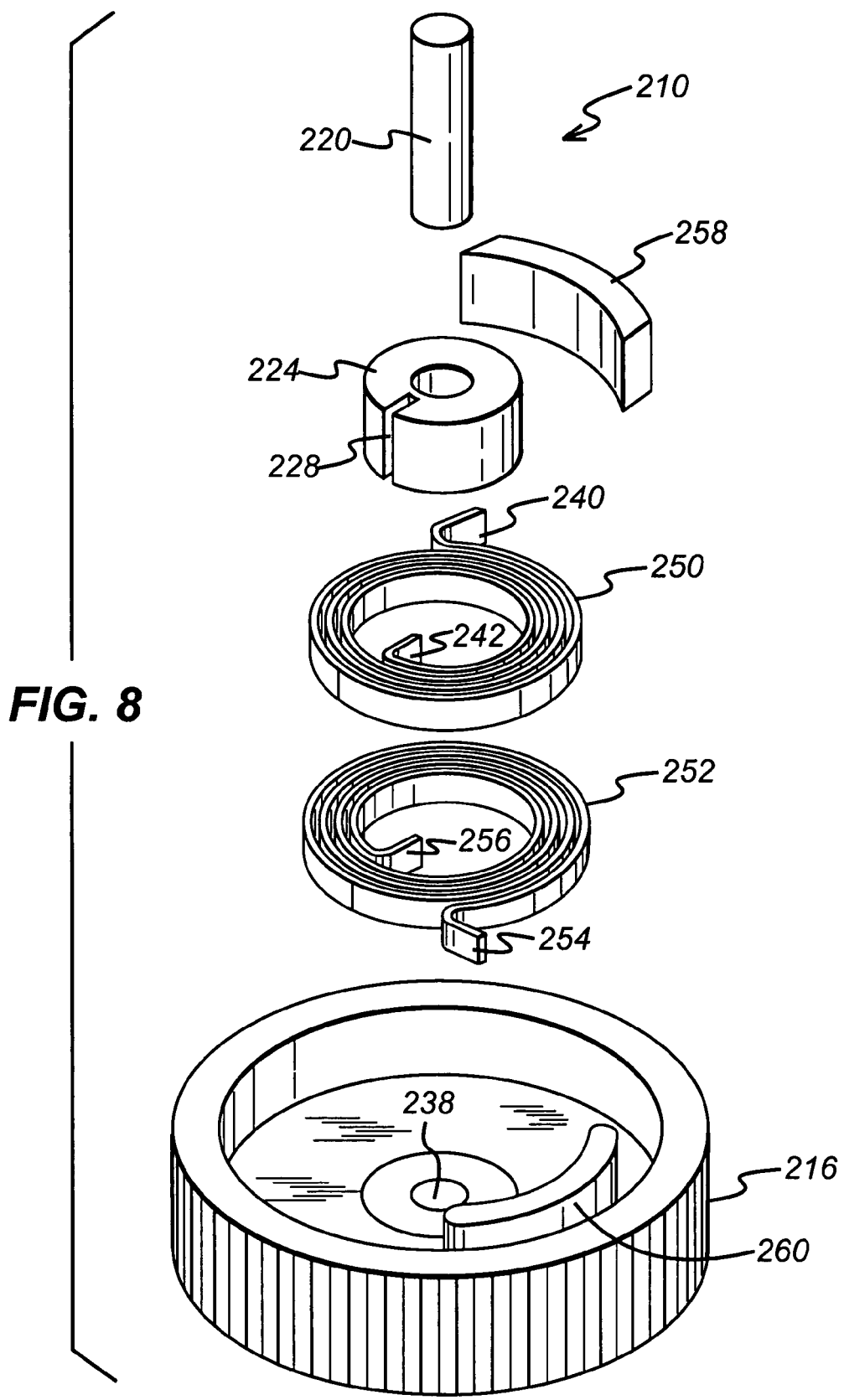
FIG. 8 is an exploded perspective view of part of the actuator assembly illustrated in FIG. 6 after actuation to a first actuated position.

FIGS. 6, 7 and 8, illustrate part of an actuator assembly 210 according to a third embodiment of the present invention with features identical or similar to the actuator assembly 110 (second embodiment) numbered 100 greater.

The third embodiment differs from the second embodiment only in that the first spiral return spring 152 and the second spiral return spring 150 are pre-tensioned when the gear wheel 116 is in the neutral position A.

FIG. 6 shows both the first spiral return spring 252 and the second spiral return spring 250 in a free state (note in particular the relative positions of outer arms 240 and 254 and inner arms 242 and 256). As in the second embodiment, the first spiral return spring 252 and the second spiral return spring 250 are identical to each other.

In FIG. 7, the first spiral return spring 252 and the second spiral return spring 250 are in an assembled position. By comparing FIG. 6 (spiral return springs 252 and 250 in their free state), it can be seen with FIG. 7 (spiral return springs 252 and 250 in their assembled state) that the relative positions of the inner arms 242 and 256 and the outer arms 240 and 254 of the spiral return springs 252 and 250 have changed. Specifically, the outer arm 240 of the second spiral return spring 250 has moved counter-clockwise relative to the inner arm 242, and the outer arm 254 of the first spiral return spring 252 has moved clockwise relative to the inner arm 256. In the assembled position of FIG. 7, both the first spiral return spring 252 and the second spiral return spring 250 are pre-tensioned. This position corresponds to the neutral position A.

Operation of the actuator assembly 210 is identical to the second embodiment except that an electric motor must overcome the initial pre-tension of the first spiral return spring 252 or the second spiral return spring 250 to move a gear wheel 216 in either the first or second direction. Thus, more effort is required from the electric motor (not shown) to rotate the gear wheel 216 in the first or second direction.

A comparison of FIG. 7 (neutral position A) and FIG. 8 (first actuated position B) shows the relative positions of the first spiral return spring 252 and the second spiral return spring 250 after actuation.

Because the actuator assembly 210 must overcome the pre-tension of either the first spiral return spring 252 or the second spiral return spring 250 when actuating the gear wheel 216 in either the first or second direction from the neutral position A, the neutral position A is better defined in comparison to actuator assemblies where the spiral return springs are not pre-tensioned in the neutral position.

Furthermore, it is possible to set the amount of pre-tension in the spiral return springs 252 and 250 to better overcome any friction in the actuator assembly 210, and thus the gear wheel 216 will always be returned to the neutral position A. In an actuator assembly that includes a degree of friction in the components, the pre-tension of the first spiral return spring 252 and the second spiral return spring 250 will ensure that the gear wheel 216 is returned to the neutral position A.

Figure 9:
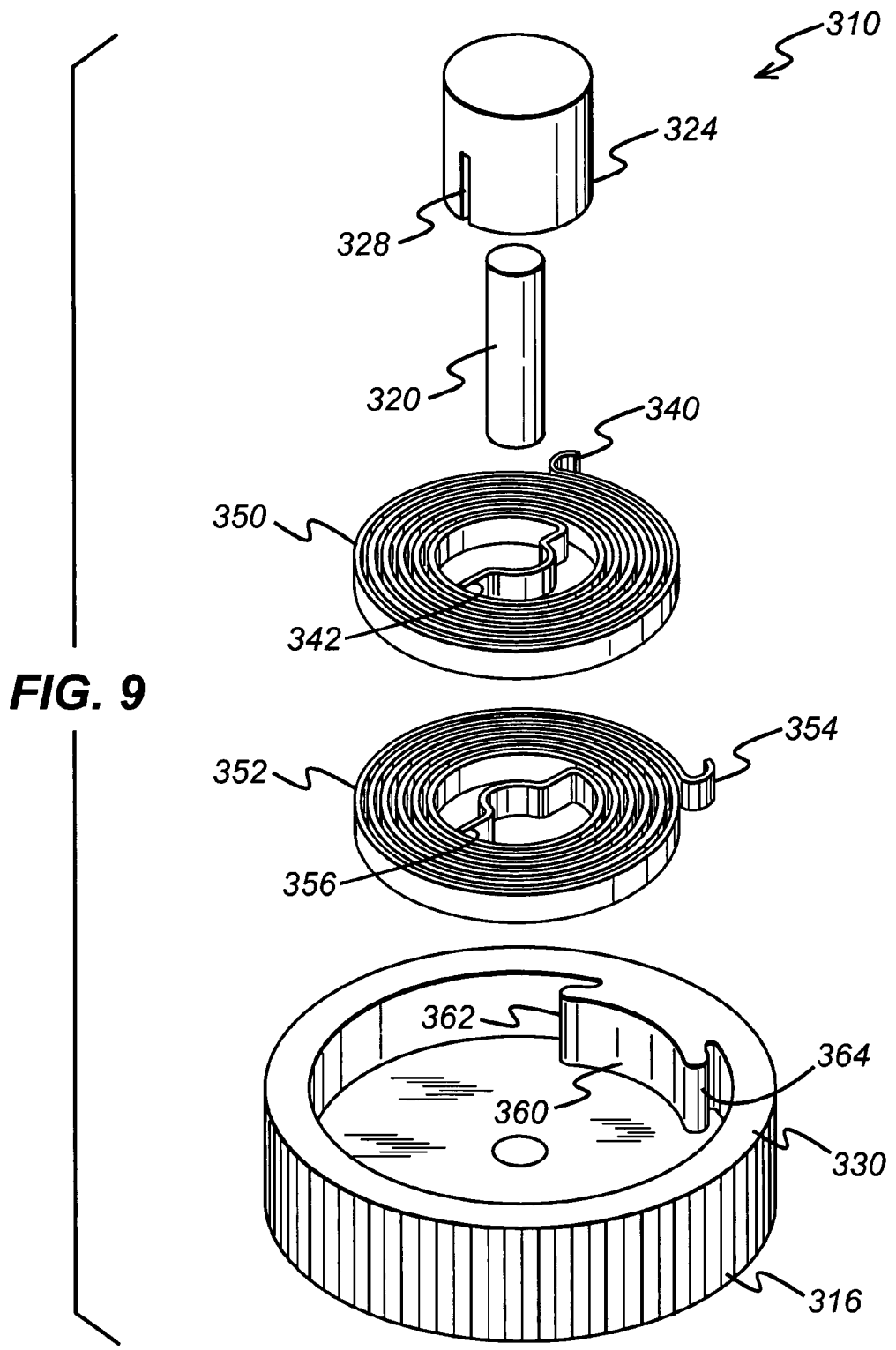
FIG. 9 is an exploded perspective view of part an actuator assembly according to a fourth embodiment of the present invention in a neutral position.
Figure 10:
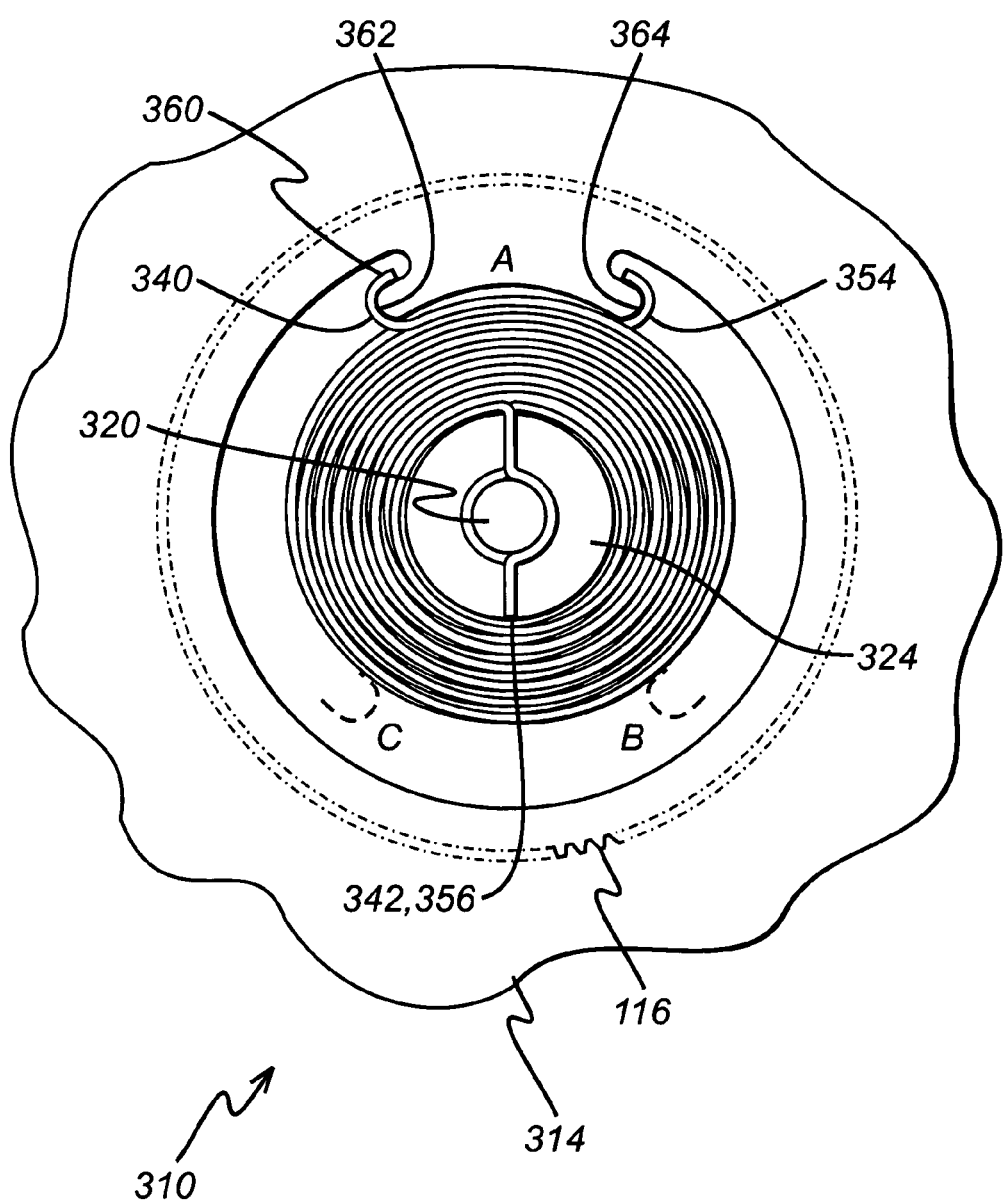
FIG. 10 is a plan view of part of the actuator assembly illustrated in FIG. 9 after assembly.

FIG. 9 and FIG. 10 show part of an actuator assembly 310 according to a fourth embodiment of the present invention with features identical or similar to the actuator assembly 110 (second embodiment) numbered 200 greater.

In FIG. 9, the actuator assembly 310 includes a gear wheel 316 with a drive formation 360. The drive formation 360 differs from the drive formation 160 of the second embodiment in that it extends from an outer wall 330, as opposed to being distinct from an outer wall 230. The drive formation 360 has a first end 362 and a second end 364.

The actuator assembly 310 includes a first spiral return spring 352 having an outer arm 354 and an inner arm 356 and a second spiral return spring 350 having an outer arm 340 and an inner arm 342. The outer arms 340 and 354 differ from those of the second embodiment in that they are bent to enable positive location on a first end 362 and a second end 364 of the drive formation 360. The inner arms 342 and 356 are also profiled to be able to locate in a spigot slot 328 of a spigot 324 and also to locate around a pivot pin 320.

FIG. 10 shows the actuator assembly 310 after it has been assembled as follows. The first spiral return spring 352 and the second spiral return spring 350 are assembled onto a chassis 314 such that the inner arms 342 and 356 locate in the spigot slot 328 of the spigot 324. It can be seen from FIGS. 9 and 10 that while the first spiral return spring 352 and the second spiral return spring 350 are identical, they are assembled onto the chassis 314 such that they are wound in opposite directions relative to each other by simply turning the second spiral return spring 350 upside down.

The gear wheel 316 is then positioned on the pivot pin 320 such that the outer arm 340 of the second spiral return spring 350 abuts the first end 362 of the drive formation 360, and the outer arm 354 of the first spiral return spring 352 abuts the second end 364 of the drive formation 360.

In FIG. 10, the actuator assembly 310 is in a neutral position A. The inner arms 356 and 342 and the outer arms 354 and 340 of the spiral return springs 350 and 352 are still in their same relative positions, and thus the spiral return springs 352 and 350 are still in their free state once assembled onto the chassis 314, i.e., the spiral return springs 352 and 350 are not pre-tensioned. Thus, the actuator assembly 310 of FIGS. 9 and 10 has no pre-tensioning.

Operation of the actuator assembly 310 is as follows. As the gear wheel 316 is rotated in a first direction (clockwise when viewing FIG. 10) by the electric motor (not shown), the second end 364 of the drive formation 360 abuts the outer arm 354 of the first spiral return spring 352 to move the outer arm 354. The inner arm 356 of the first spiral return spring 352 does not move because it is located in the spigot slot 328, and the spigot 324 is integral with the chassis 314. As the gear wheel 316 is rotated in the first direction, the first spiral return spring 352 winds up as the outer arm 354 moves clockwise relative to the inner arm 356.

With the first spiral return spring 352 in a first actuated position B, the outer arm 354 of the first spiral return spring 352 acts upon the second end 364 of the drive formation 360 to bias the gear wheel 316 back towards the neutral position A. After actuation to the first actuated position, the gear wheel 316 is biased towards the neutral position A by the first spiral return spring 352.

As the gear wheel 316 is rotated in the first direction, the outer arm 340 of the second spiral return spring 350 remains stationary as the first end 362 of the drive formation 360 moves away from it. As with the first spiral return spring 352, the inner arm 342 of the second spiral return spring 350 does not move because it is located in the spigot slot 328, and the spigot 324 is integral with the chassis 314. As the gear wheel 316 rotates clockwise, neither the outer arm 340 nor the inner arm 342 of the second spiral return spring 350 moves. Therefore, the second spiral return spring 350 is not unwound as the first spiral return spring 352 is wound. The actuator assembly 310 does not have to work against the second spiral return spring 350 when driving the actuator assembly 310 in the first direction. When the gear wheel 316 is rotated in the first direction, the second spiral return spring 350 is idle.

The electric motor (not shown) can also rotate the gear wheel 316 in a second direction (counter-clockwise when viewing FIG. 10) towards a second actuated position C. Operation of the actuator assembly 310 in the second direction is identical to that in the first direction except that the second spiral return spring 350 biases the gear wheel 316 towards the neutral position A from the second actuated position C. Similarly, the first spiral return spring 352 is not unwound as the second spiral return spring 350 winds up, and the first spiral return spring 352 is idle.

Figure 11:
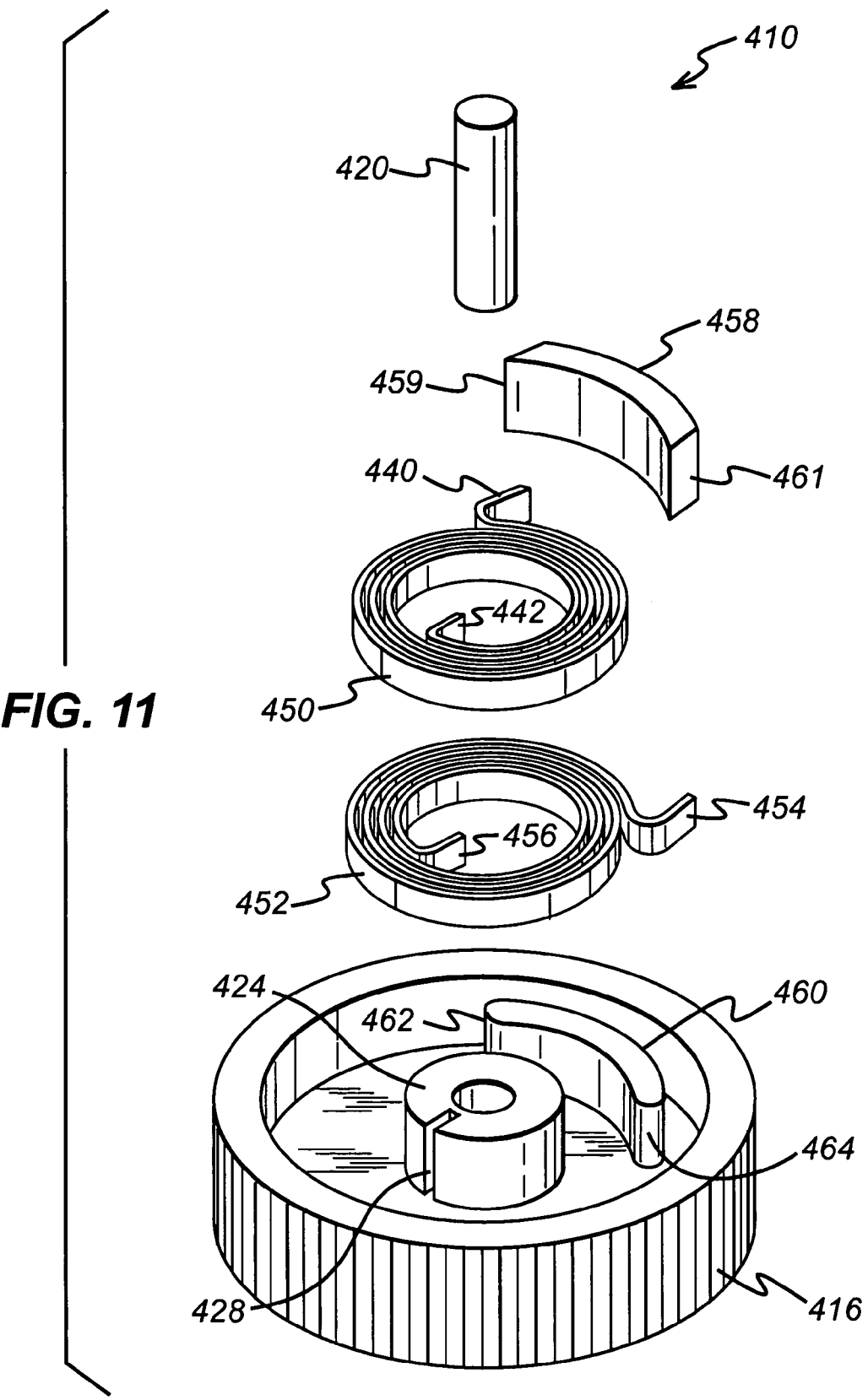
FIG. 11 is an exploded perspective view of part of an actuator assembly according to a fifth embodiment of the present invention in a neutral position.
Figure 12:
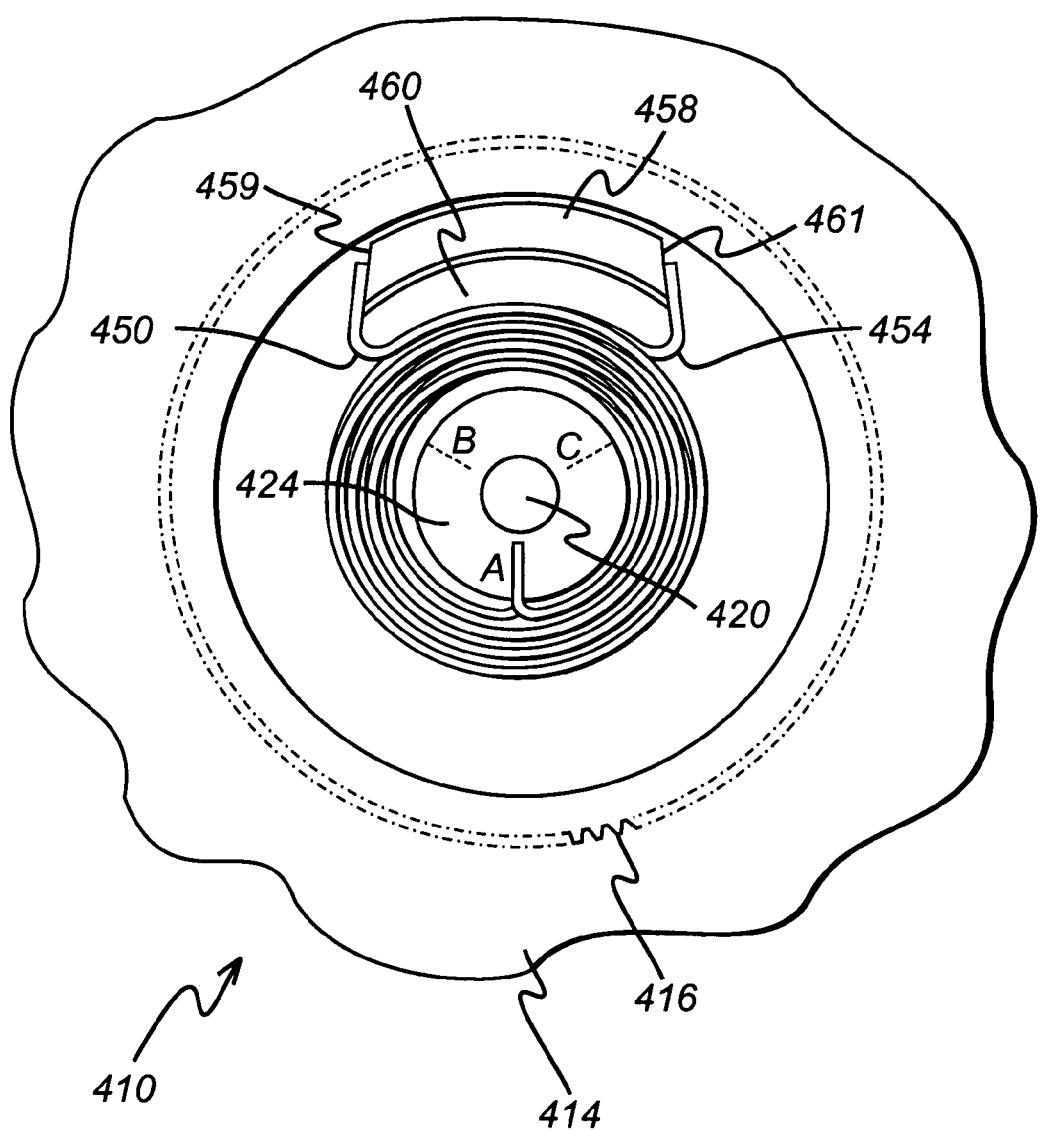
FIG. 12 is a plan view of part of the actuator assembly illustrated in FIG. 11 after assembly.

FIG. 11 and FIG. 12 show part of an actuator assembly 410 according to a fifth embodiment of the present invention with features identical or similar to the actuator assembly 110 (second embodiment) numbered 300 greater.

The fifth embodiment is identical to the second embodiment except the spigot 124 is integral with a gear wheel 116 to form a combined gear wheel 416. A first spiral return spring 450 and a second spiral return spring 452 have swapped positions, i.e., the first spiral return spring 450 is shown as the top spring when viewing FIG. 11 and is positioned above the second spiral return spring 452, shown as the bottom spring when viewing FIG. 11.

FIG. 11 shows that a spigot 424 is integral to a combined gear wheel 416. Typically, the strength requirements of the spigot 424 and the combined gear wheel 416 are similar. Therefore the combined gear wheel 416 and the spigot 424 can be produced as a one-piece molding.

FIG. 12 shows the actuator assembly 410 after it has been assembled as follows. The second spiral return spring 452 is assembled onto the combined gear wheel 416 such that an outer arm 454 abuts a second end 464 of a drive formation 460, and an inner arm 456 locates in a spigot slot 428. The first spiral return spring 450 is then assembled onto the combined gear wheel 416 such that an outer arm 440 abuts a first end 462 of the drive formation 460 and an inner arm 442 locates in the spigot slot 428.

As in the second embodiment, while the first spiral return spring 450 and the second spiral return spring 452 are identical, they are assembled onto the combined gear wheel 416 such that they are wound in opposite directions relative to each other by simply turning the second spiral return spring 452 upside down.

Once the spiral return springs 450 and 452 have been assembled onto the combined gear wheel 416, the combined gear wheel 416 can be mounted on a pivot pin 420 on a chassis 414.

Because the first spiral return spring 450 and the second spiral return spring 452 are mounted on the combined gear wheel 416 as opposed to the chassis 414, it is possible for both the spiral return springs 450 and 452 and the combined gear wheel 416 to be provided as a subassembly, which can then subsequently be assembled onto the chassis 414. This makes assembly more efficient because the potentially complex step of locating the spiral return springs 450 and 452 can be conducted remotely from the chassis 414.

Operation of the actuator assembly 410 is as follows. In reference to FIG. 12, as the combined gear wheel 416 is rotated in the first direction (clockwise), the outer arm 440 of the first spiral return spring 450 remains stationary as the first end 462 of the drive formation 460 moves away from the outer arm 440 and the outer arm 440 abuts first end 459 of a stop 458, that does not move because it is integral with the chassis 414. The inner arm 442 of the first spiral return spring 450 moves from the neutral position A to the first actuated position B because it is located in the spigot slot 428, and the spigot 424 is integral with the combined gear wheel 416. As the combined gear wheel 416 is rotated, the first spiral return spring 450 winds up as the inner arm 442 moves towards the outer arm 440, which is prevented from moving in the first direction by the stop 458. In this embodiment, the first spiral return spring 450 is wound up due to the rotation of the spigot 424 relative to the chassis 414 and not due to rotation of the drive formation 460 relative to the chassis 414.

In the first actuated position B, the inner arm 442 of the first spiral return spring 450 acts upon the spigot slot 428 of the spigot 424 to bias the combined gear wheel 416 back towards the neutral position A. After being actuated to the first actuated position, the combined gear wheel 416 is biased towards the neutral position A by the first spiral return spring 450.

As the combined gear wheel 416 is rotated in the first direction, the second end 464 of the drive formation 460 abuts the outer arm 454 of the second spiral return spring 452 to move the outer arm 454 of the second spiral return spring 452. The inner arm 456 of the second spiral return spring 452 also moves because it is located in the spigot slot 428, and the spigot 424 is integral with the combined gear wheel 416. As the combined gear wheel 416 is rotated in the first direction, the second spiral return spring 452 is not wound up because the inner arms 442 and 456 and the outer arms 440 and 454 do not move relative to each other. The electric motor (not shown) does not have to work against the second spiral return spring 452 when driving the combined gear wheel 416 in the first direction. In this embodiment, the second spiral return spring 452 can be classed as idle, but in contrast to the second, third and fourth embodiments, the second spiral return spring 452 is idle because both the inner arm 456 and the outer arm 454 of the second spiral return spring 452 move with the combined gear wheel 416. Hence, there is no relative movement of the inner arm 456 and the outer arm 454, as opposed to neither the inner arm 456 nor the outer arm 454 moving with the combined gear wheel 416 where there is no movement and no relative movement of the inner arm 456 or the outer arm 454.

Figure 13:
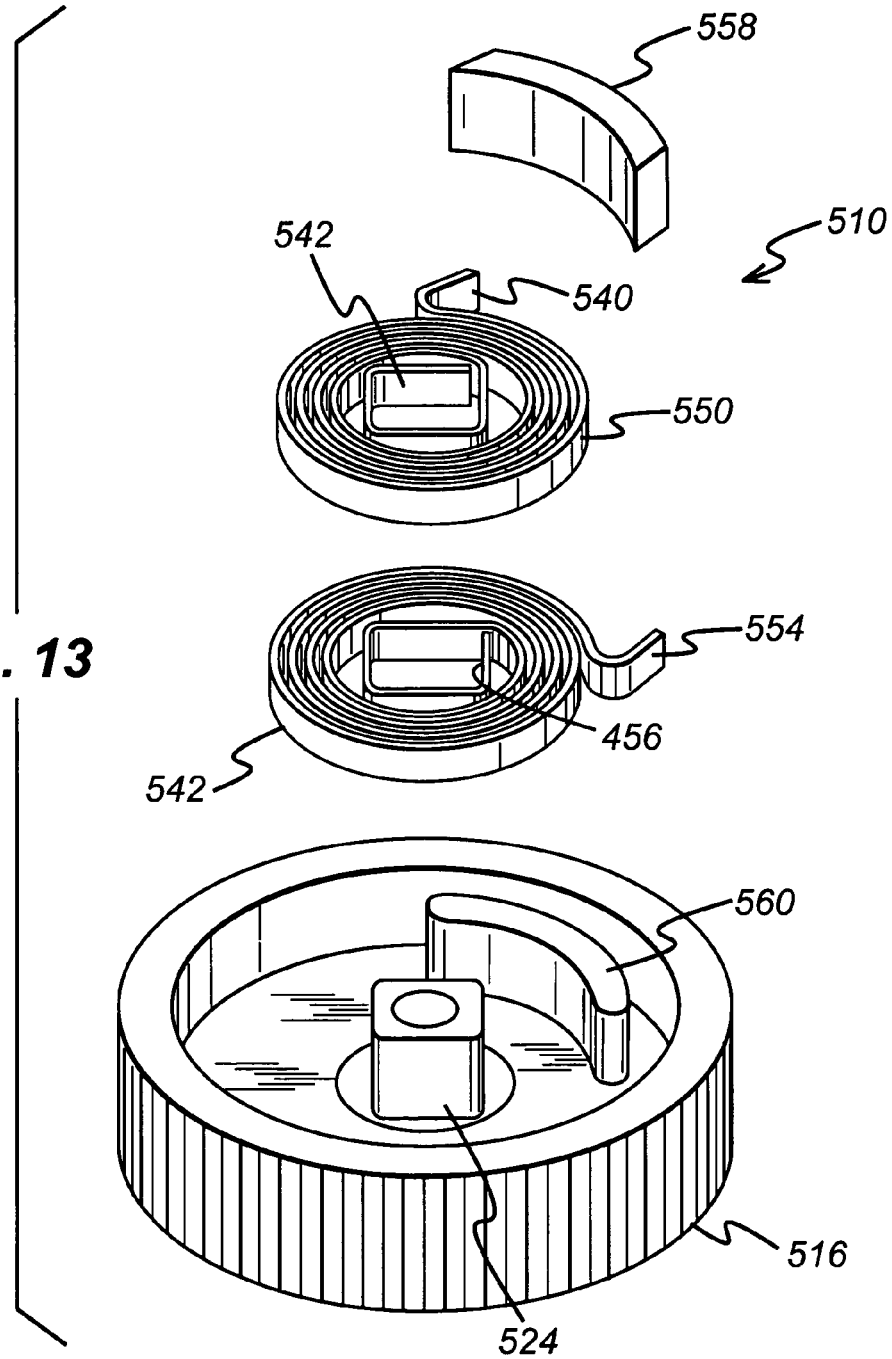
FIG. 13 is an exploded perspective view of part of an actuator assembly according to a sixth embodiment of the present invention in a neutral position.
Figure 14:
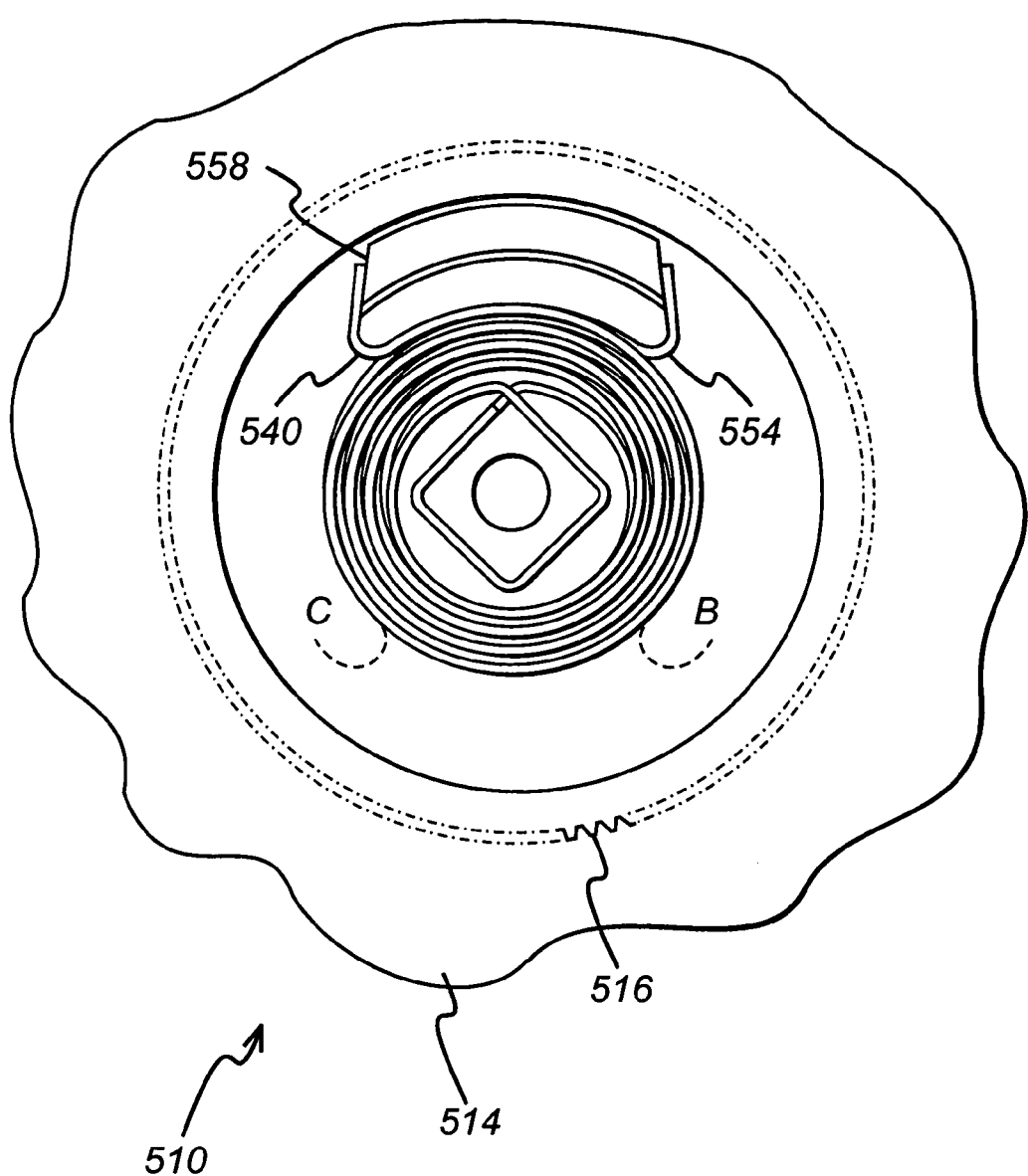
FIG. 14 is a plan view of part of the actuator assembly illustrated in FIG. 13 after assembly.

In reference to FIGS. 13 and 14, part of an actuator assembly 510 according to a sixth embodiment of the present invention is shown, with features identical or similar to the actuator assembly 410 (fifth embodiment) numbered 100 greater.

The sixth embodiment is identical to the fifth embodiment except that the actuator assembly 510 has a square spigot 524 and modified spring arms.

In FIG. 13, inner arms 542 and 556 are both bent to form a square profile that locates around the square spigot 524 and avoid the need for a slot in the square spigot 524 to retain the inner arms 542 and 556. This is advantageous because the square spigot 524 is less likely to burst result in failure if there is no slot. The operation of the actuator assembly 510 is identical to the fifth embodiment.

FIGS. 15 to 18C show part of an actuator assembly 610 according to a seventh embodiment of the present invention with features identical or similar to the actuator assembly 410 (fifth embodiment) numbered 200 greater. The seventh embodiment is identical and operates in the same way as the fifth embodiment except that the first and second spiral return springs are pre-tensioned when in the neutral position.

Figure 15:
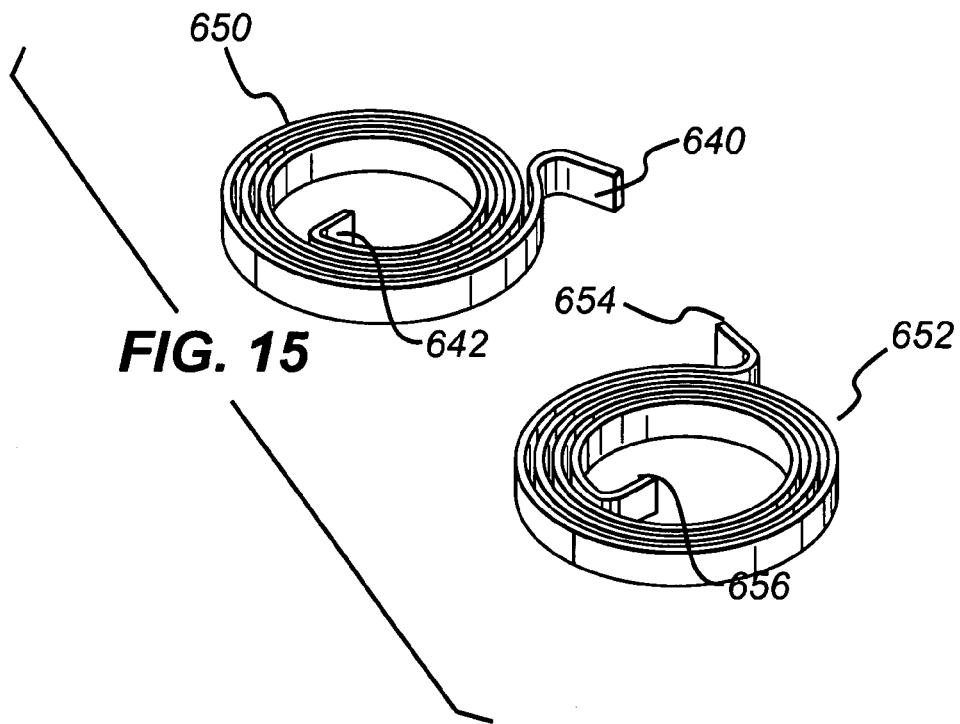
FIG. 15 is an exploded perspective view of a first spiral return spring and a second spiral return spring of an actuator assembly according to a seventh embodiment of the present invention in a free state.
Figure 18A:
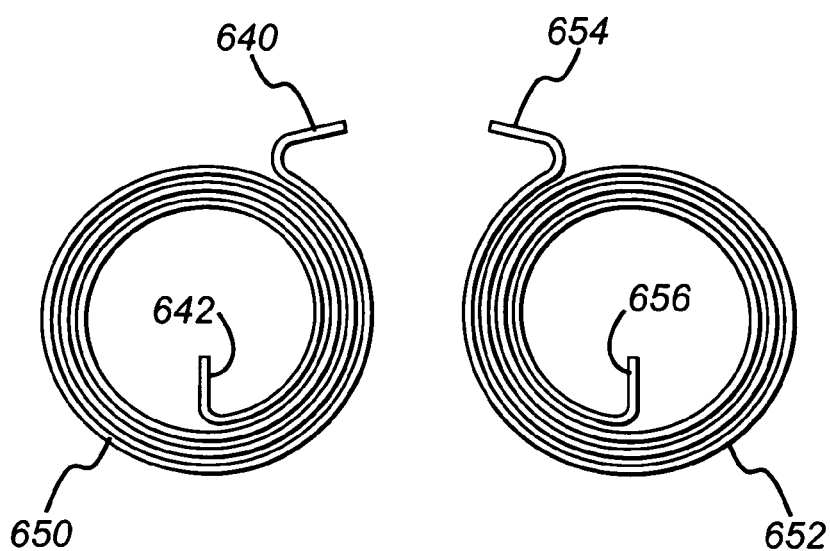
FIG. 18A is a plan view of the first spiral return spring and the second spiral return spring of the actuator assembly illustrated in FIG. 15 in their free state.
Figure 16:
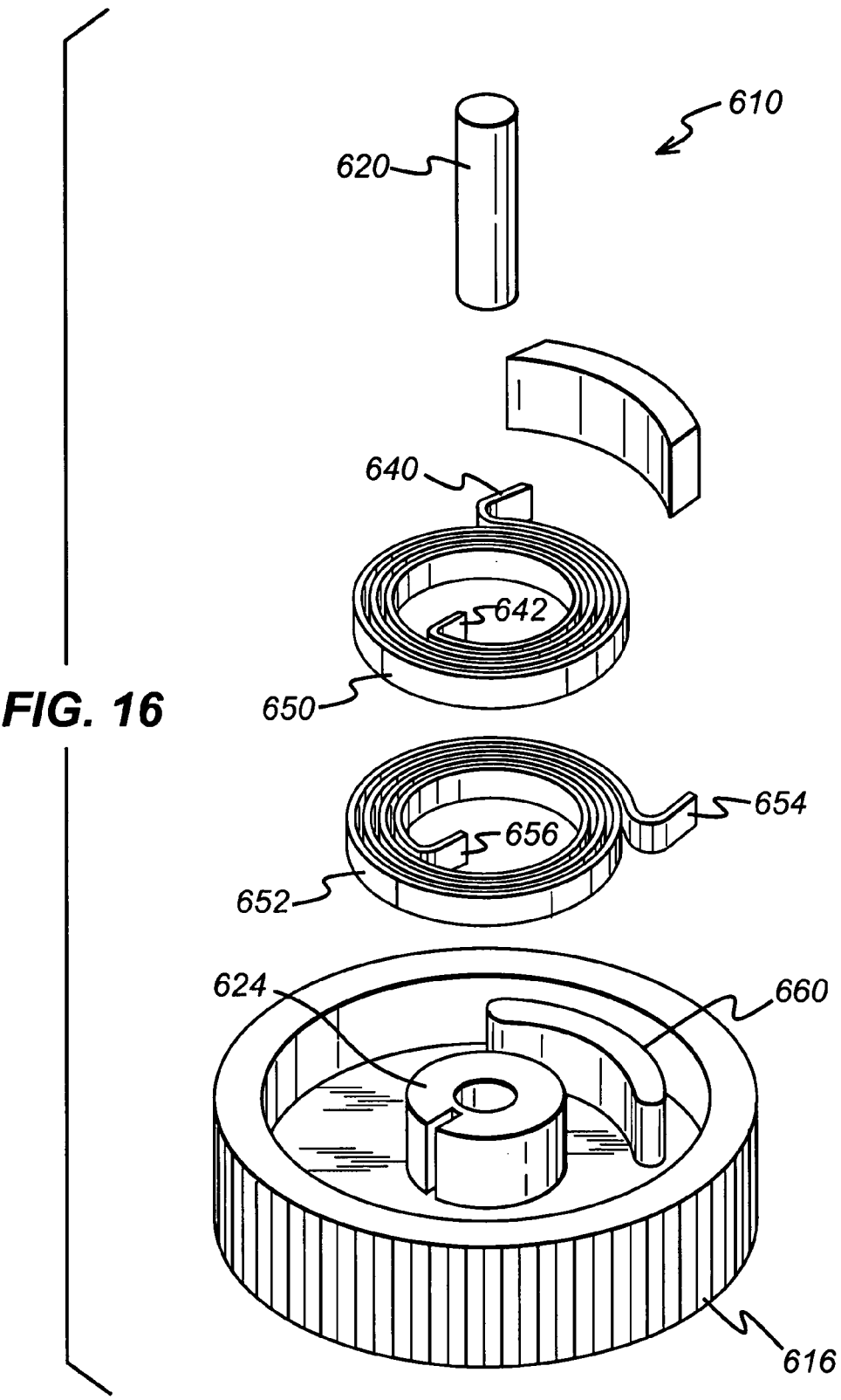
FIG. 16 is an exploded perspective view of part of the actuator assembly illustrated in FIG. 15 in a neutral position.
Figure 17:
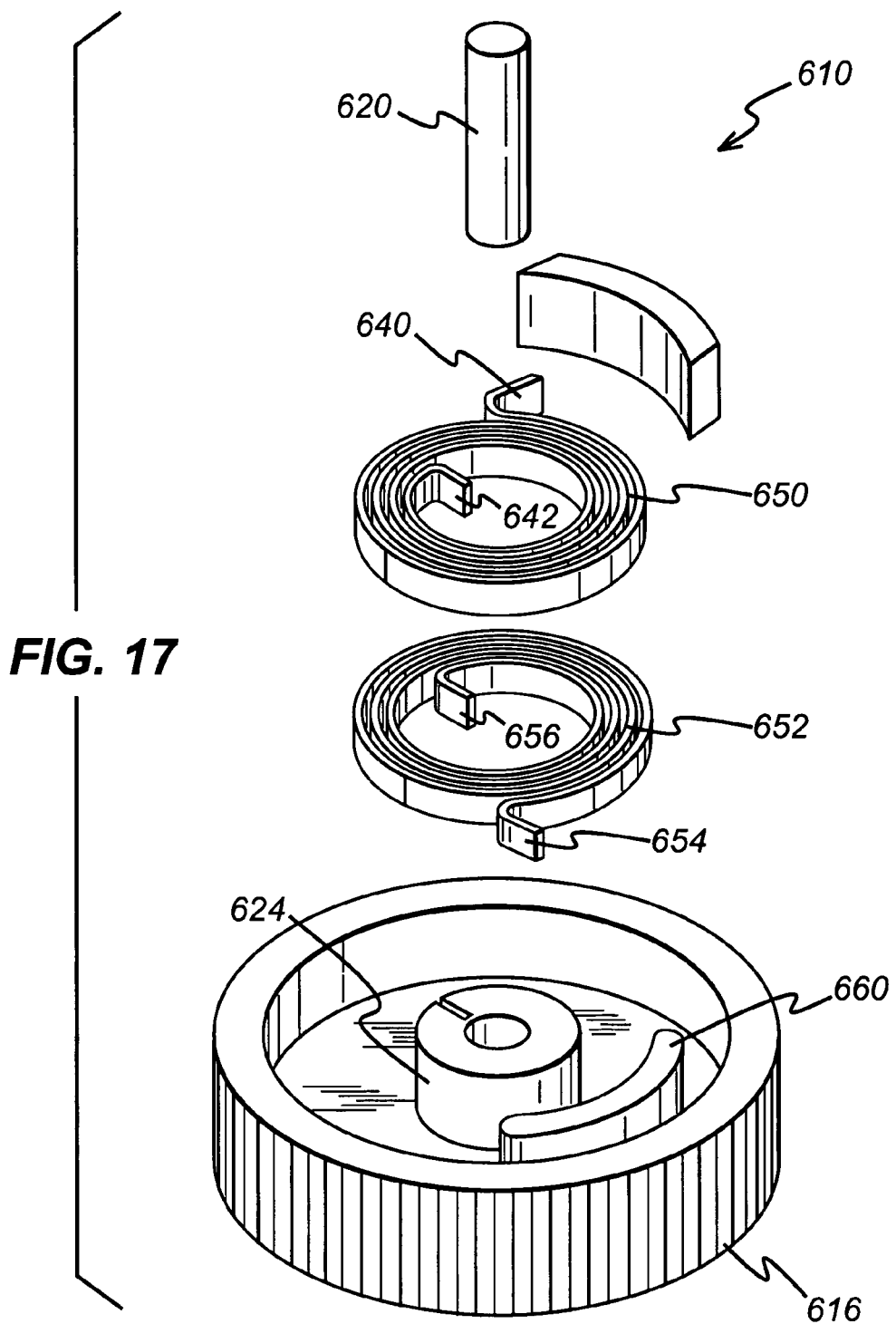
FIG. 17 is an exploded perspective view of part of the actuator assembly illustrated in FIG. 15 after actuation to a first actuated position.
Figure 18B:
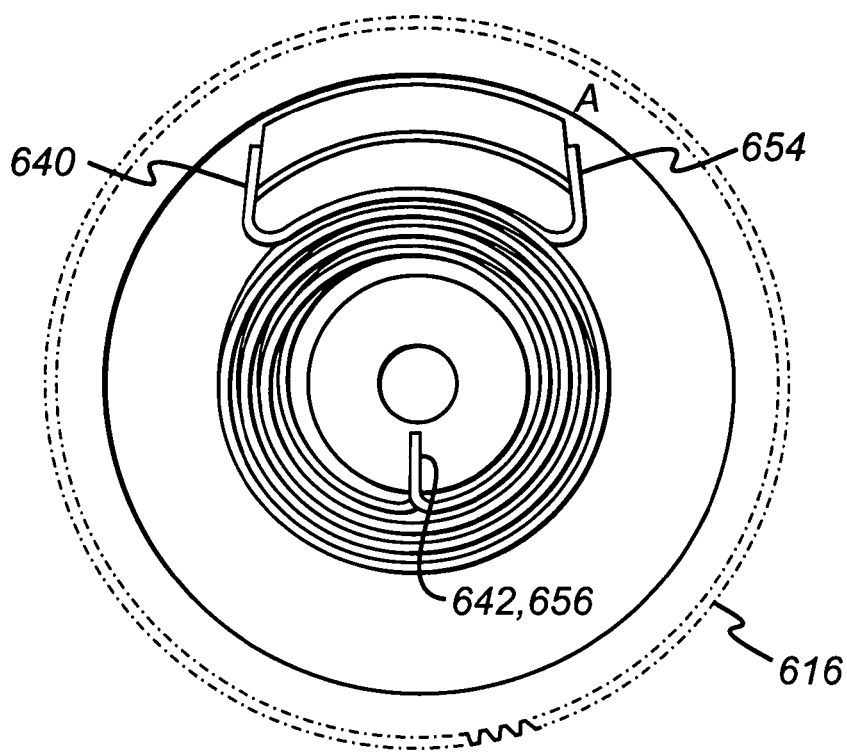
FIG. 18B is a plan view of part of the actuator assembly illustrated in FIG. 15 in a neutral position.

A comparison of FIG. 15 shows the spiral return springs 650 and 652 in a free state, and FIG. 16 shows the spiral return springs 650 and 652 in a neutral position A. FIGS. 18A and 18B, in particular the relative positions of the spiral return spring outer arms 640 and 654 and inner arms 642 and 656, show the spiral return springs 650 and 652 in pre-tension as previously illustrated in the third embodiment.

Figure 18C:
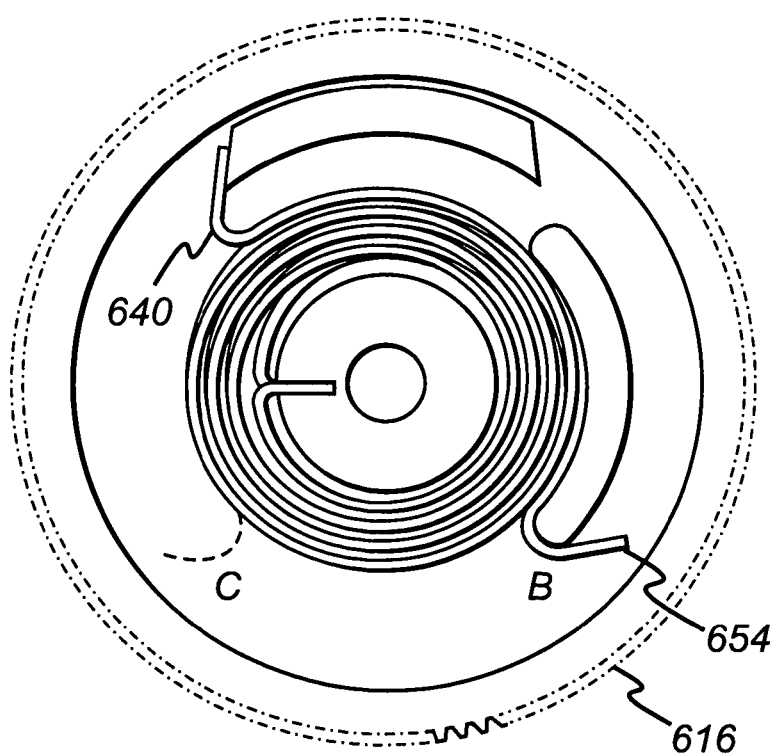
FIG. 18C is a plan view of part of the actuator assembly illustrated in FIG. 15 after actuation to a first actuated position.

FIG. 18B (neutral position A) and FIG. 18C (first actuated position B) show the positions of the spiral return springs 650 and 652 before and after actuation in the first direction to the first actuated position B.

Figure 19:
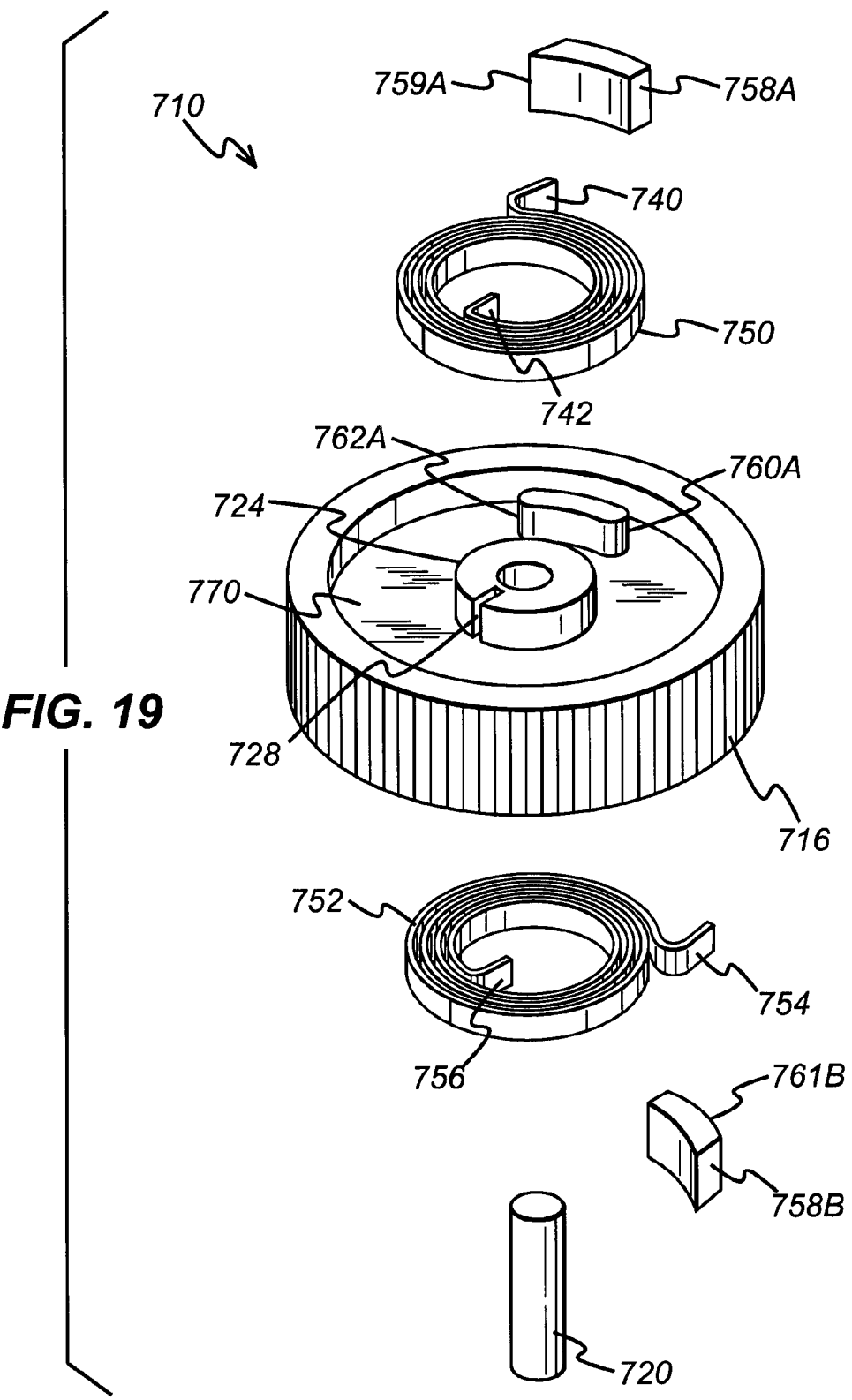
FIG. 19 is an exploded perspective upper view of part of an actuator assembly according to an eight embodiment of the present invention in a neutral position.
Figure 20:
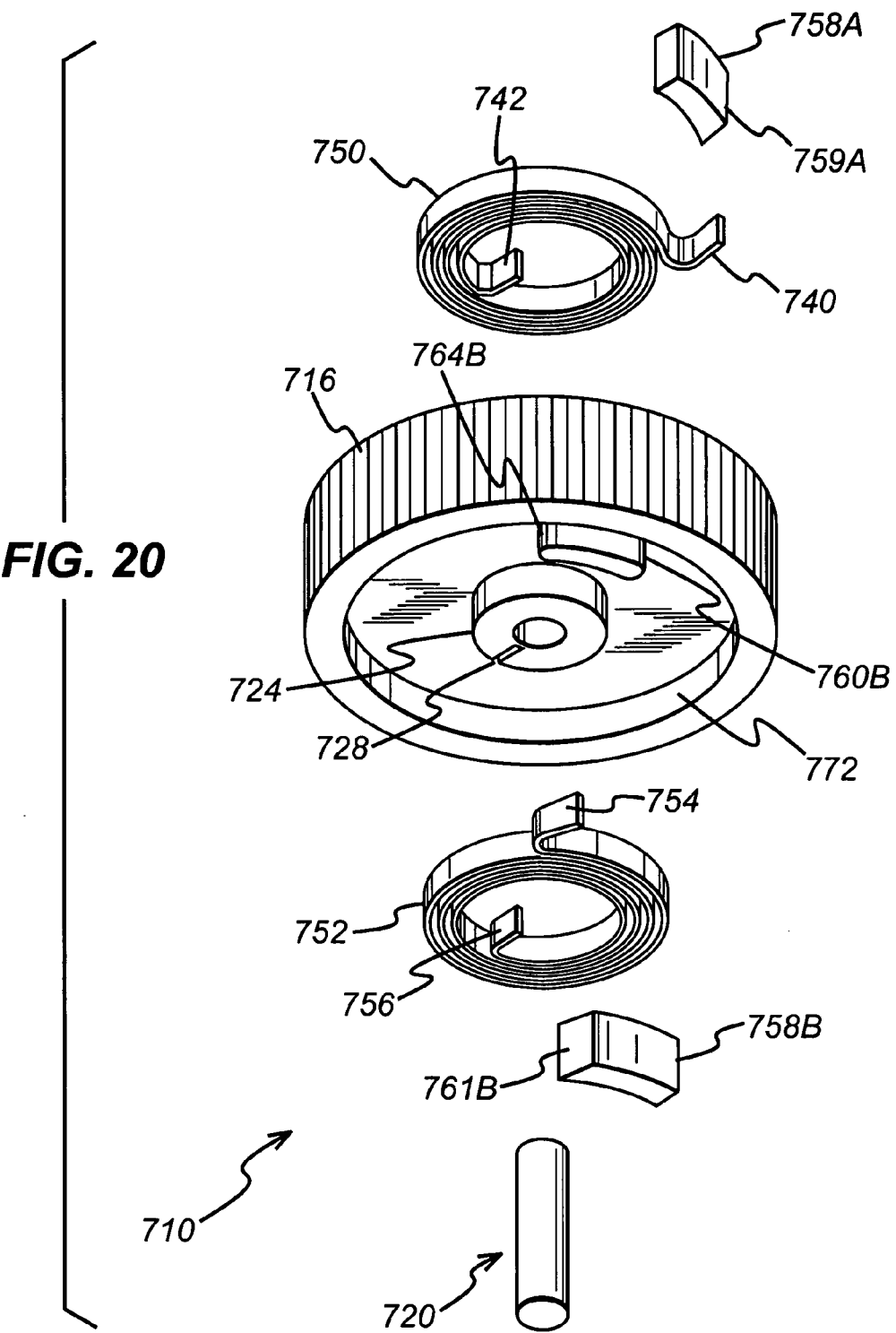
FIG. 20 is an exploded perspective lower view of the part of the actuator assembly illustrated in FIG. 19 in a neutral position.
Figure 21:
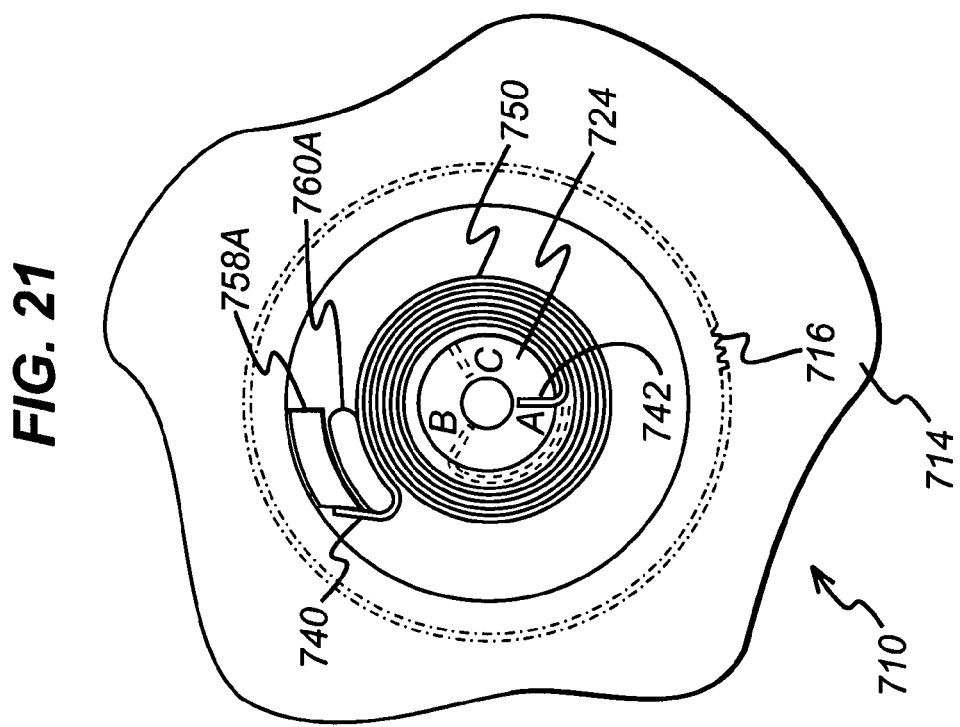
FIG. 21 is a plan view of the actuator assembly illustrated in FIG. 19 in a neutral position.

FIGS. 19 to 21 show part of an actuator assembly 710 according to an eighth embodiment of the present invention with features identical or similar to the actuator assembly 410 (fifth embodiment) numbered 300 greater. The actuator assembly 710 is identical to the fifth embodiment except that the first and second spiral return springs 750 and 752 are mounted on opposite sides of a gear wheel 716.

In FIGS. 19 and 20, the gear wheel 716 has an upper surface 770 and a lower surface 772, and the gear wheel 716 including an upper drive formation 760A is mounted on the upper surface 770 and a lower drive formation 760B is mounted on the lower surface 772. The upper drive formation 760A has a first end 762A, and the lower drive formation 760B has a second end 764B.

The gear wheel 716 has a spigot 724 that is integral with and extends from the upper surface 770 and the lower surface 772 of the gear wheel 716 and includes a spigot slot 728.

The first and second spiral return springs 750 and 752 are identical to those of the fifth embodiment. An upper stop 758A is mounted on and integral with an upper part of a chassis 714, and a lower stop 758B is mounted on and integral with a lower part of the chassis 714. The upper stop 758A has a first end 759A, and the lower stop 758B has a second end 761B.

FIG. 21 shows the actuator assembly 710 after it has been assembled as follows. The first spiral return spring 750 is assembled onto the upper surface 770 of the gear wheel 716 such that an outer arm 740 abuts the first end 762A of the upper drive formation 760A, and an inner arm 742 locates in the spigot slot 728. The second spiral return spring 752 is assembled onto the lower surface 772 of the gear wheel 716 such that an outer arm 754 abuts the second end 764B of the lower drive formation 760B, and an inner arm 756 locates in the spigot slot 728. It can be seen from FIG. 19 and FIG. 20 that the first and second spiral return springs 750 and 752 are assembled such that they are counter-rotating. This can be achieved by simply turning one of the spiral return springs 750 and 752 upside down.

By locating the first and second spiral return springs 750 and 752 on either side of the gear wheel 716, the possibility of the spiral return springs 750 and 752 become entwined is eliminated because they are no longer in physical contact. After assembling the spiral return springs 750 and 752 onto the gear wheel 716, the gear wheel 716 is then located onto a pivot 720 mounted on the chassis 714.

Operation of the actuator assembly 710 is as follows. As the gear wheel 716 is rotated in the first direction (clockwise) by the electric motor (not shown), the outer arm 740 of the first spiral return spring 750 remains stationary as the first end 762A of the upper drive formation 760A moves away from it, and the outer arm 740 abuts the first end 759A of the upper stop 758A, which does not move because it is integral with the chassis 714. The inner arm 742 of the first spiral return spring 750 moves because it is located in the spigot slot 728, and the spigot 724 is integral with the gear wheel 716. As the gear wheel 716 is rotated, the first spiral return spring 750 winds up as the inner arm 742 moves towards the outer arm 740, which is prevented from moving in the first direction by a stop 758.

After actuation in the first direction to the first actuated position B, the inner arm 742 of the first spiral return spring 750 acts upon the spigot slot 728 of the spigot 724 to bias the gear wheel 716 back towards the neutral position A.

As the gear wheel 716 is rotated in the first direction, the second end 764B of the lower drive formation 760B abuts the outer arm 754 of the second spiral return spring 752 to move the outer arm 754 of the second spiral return spring 752. The inner arm 756 of the second spiral return spring 752 also moves because it is located in the spigot slot 728, and the spigot 724 is integral with the gear wheel 716. As the gear wheel 716 is rotated in the first direction, the second spiral return spring 752 is not wound because the inner arms 742 and 756 and the outer arms 740 and 754 both move and thus do not move relative to each other.

Figure 23:
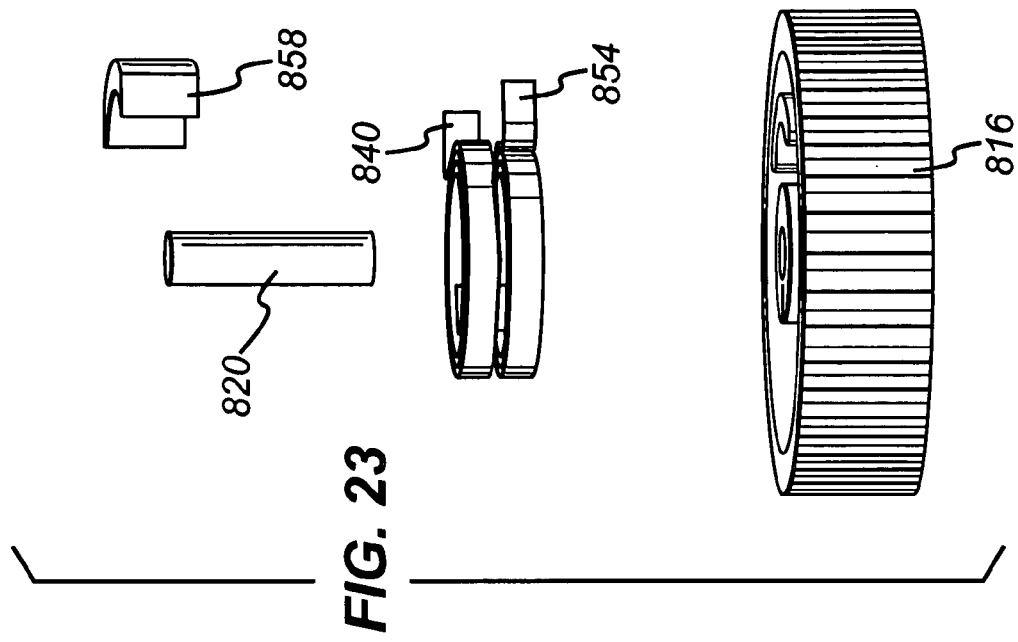
FIG. 23 is an alternative exploded perspective view of the components illustrated in FIG. 22.
Figure 22:
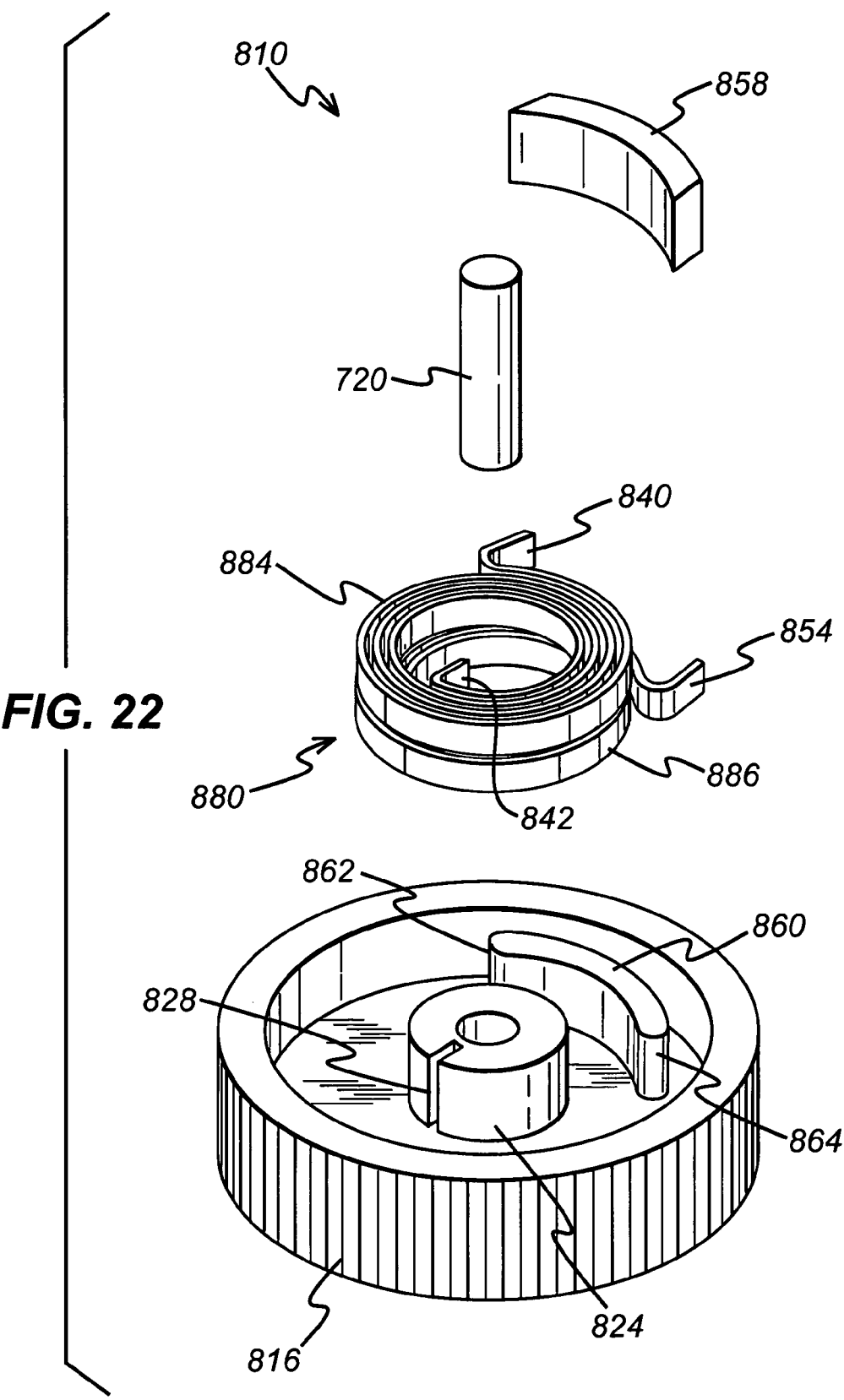
FIG. 22 is an exploded perspective view of part of an actuator assembly according to a ninth embodiment of the present invention in a neutral position.

FIGS. 22 to 24 show part of an actuator assembly 810 according to a ninth embodiment of the present invention with features identical or similar to the actuator assembly 410 (fifth embodiment) numbered 400 greater. The ninth embodiment is identical to the fifth embodiment except that the first and second spiral return springs 850 and 852 are integrated to form a combined spring 880.

In reference to FIG. 22 and FIG. 23, the actuator assembly 810 includes a spring arrangement in the form of the combined spring 880. The combined spring 880 is a single component having a common inner arm 842 (as opposed to separate inner arms 442 and 456 of the fifth embodiment), a first outer arm 854, and a second outer arm 840. The combined spring 880 is arranged such that it is wound counter-clockwise from the common inner arm 842 to the second outer arm 840 to form an upper spring portion 884 corresponding to and behaving in the same way as the first spiral return spring 450 of the fifth embodiment and clockwise from the common inner arm 842 to the first outer arm 854, forming a lower spring portion 886 corresponding to and behaving in the same way as the second spiral return spring 452 of the fifth embodiment.

Figure 24A:
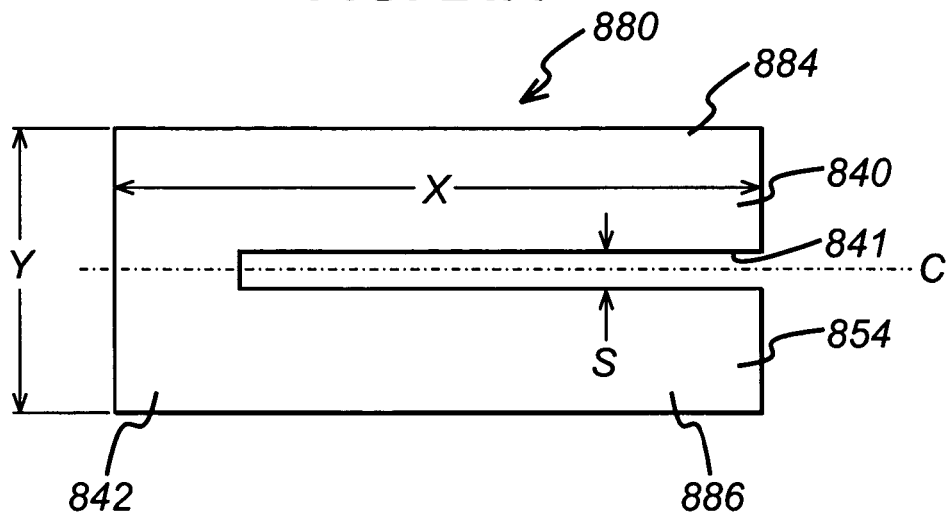
FIG. 24A is an enlarged developed view of a combined spring of the actuator assembly illustrated in FIG. 22.

FIG. 24A shows a blank of the developed combined spring 880. The combined spring 880 is formed by creating an appropriate sized blank of substantially rectangular shape having a length X and a height Y and cutting a slot 841 of height S about a center line C of the blank. The remaining part of the blank length that is not cut to form the slot 841 defines the length of the common inner arm 842. The upper spring portion 884 is then wound in one direction about the common inner arm 842, and the lower spring portion 886 is wound in the opposite direction such that the upper spring portion 884 and lower spring portion 886 are counter-rotating. The slot 841 prevents the upper spring portion 884 and the lower spring portion 886 from becoming entwined when the upper spring portion 884 and the lower spring portion 886 are wound in opposite directions and during subsequent operation when assembled in the actuator assembly 810. It can be seen from FIG. 24A that the common inner arm 842 has a height Y, and the first outer arm 854 and the second outer arm 840 have combined heights that equal the height of the blank, taking into consideration the slot 841 height S.

The combined spring 880 is assembled onto the gear wheel 816 such that the first outer arm 854 abuts a second end 864 of a drive formation 860, and the second outer arm 840 abuts a first end 862 of the drive formation 860. The common inner arm 842 locates in a spigot slot 828.

By providing the combined spring 880 as opposed to the two spiral return springs 450 and 452 of the fifth embodiment, assembly is easier by virtue of having one less component. It is also possible to arrange the common inner arm 842 such that the upper spring portion 884 and the lower spring portion 886 portion of the combined spring 880 are spaced apart, further reducing the possibility of the portions become entwined.

Furthermore, the combined spring 880 can be assembled either way without effecting operation of the assembly, and thus assembly is more efficient.

Operation of the actuator assembly 810 is identical to the fifth embodiment, with the upper spring portion 884 acting in the same way as the first spiral return spring 450 and the lower spring portion 886 acting in the same way as the second spiral return spring 452.

Figure 24B:
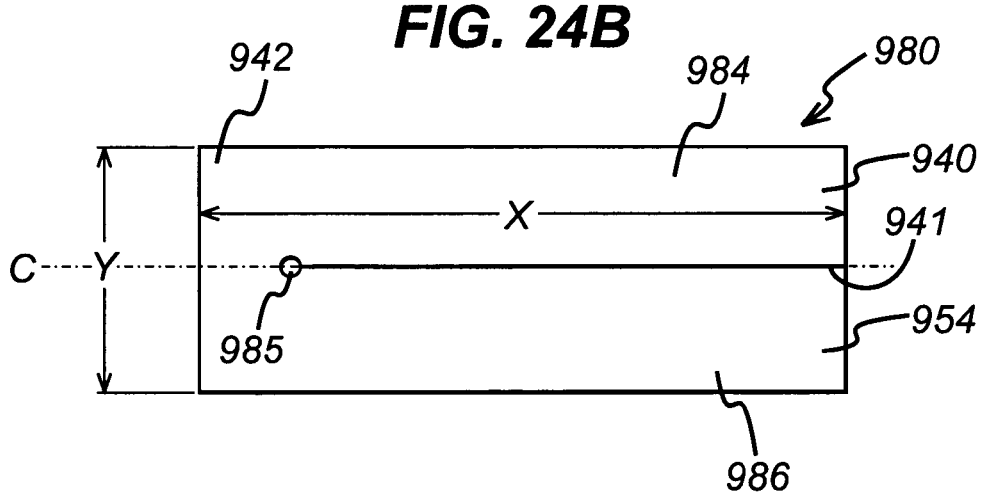
FIG. 24B is an enlarged developed view of an alternative combined spring.

FIG. 24B shows an alternative combined spring blank 980. The alternative combined spring blank 980 differs from the blank of FIG. 24A in that a slot 941 is formed by first creating a hole 995 at a point on the center line C corresponding to the edge of a common inner arm 942 and then shearing the alternative spring blank 980 along the center line towards the hole 995. An upper spring portion 984 and a lower spring portion 986 are then deformed to create a gap (not shown) that prevents the upper and lower spring portions 984 and 986 from becoming entwined when the upper and lower spring portions 984 and 986 are wound in opposite directions and during subsequent operation when assembled in the actuator assembly 910.

Figure 24C:
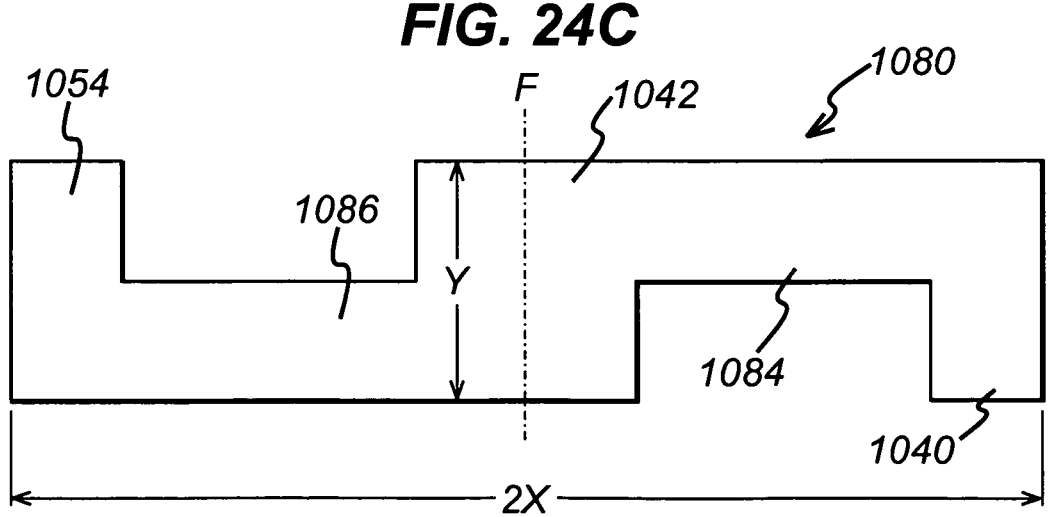
FIG. 24C is an enlarged developed view of another alternative combined spring.
Figure 25:
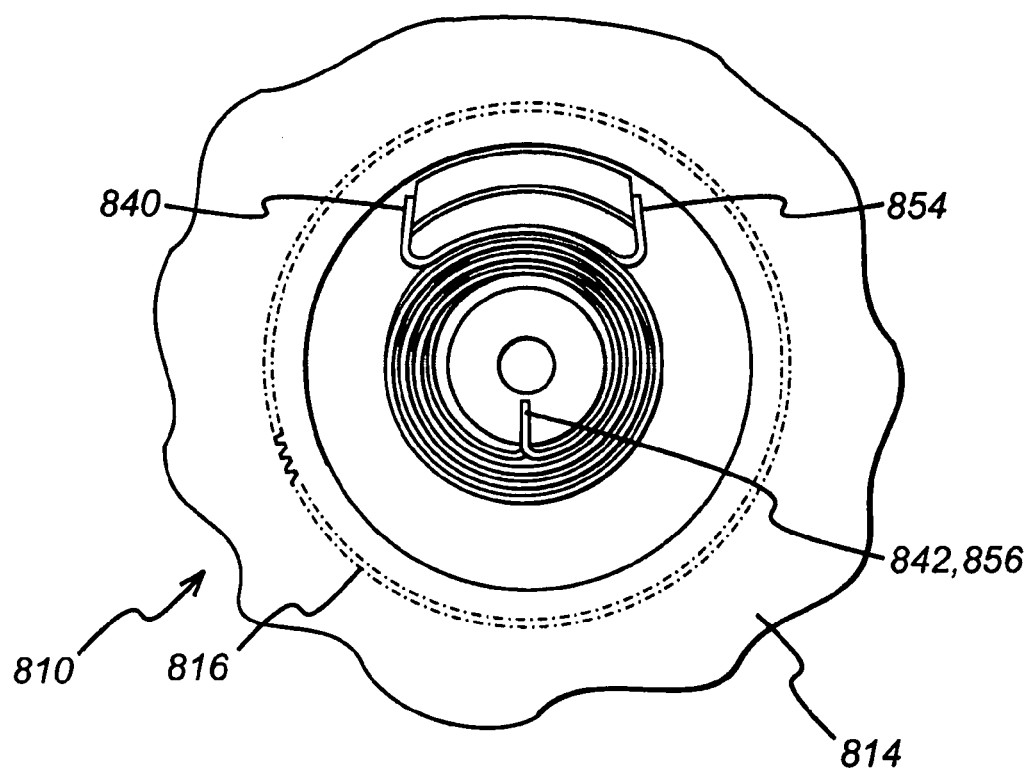
FIG. 25 is a plan view of part of the actuator assembly illustrated in FIG. 22 in a neutral position.

FIG. 24C shows an alternative combined spring blank 1080. The alternative combined spring blank 1080 differs from the alternative combined spring blank 980 of FIG. 24A in that the alternative combined spring blank 1080 is substantially S-shaped (with square corners) as opposed to substantially rectangular shaped. A combined spring is formed by folding the alternative combined spring blank 1080 about a fold line F (situated half way along the length of the blank) to create a common inner arm 1042 and then winding an upper portion 1084 and a lower portion 1086 in opposite directions about the common inner arm. The common inner arm 1042 will be twice the thickness of that of the blank used to form the combined spring 880 because the blank is folded over onto itself. It can be seen from FIG. 24C that the first and second outer arms 1054 and 1040 are of height Y, i.e., they extend the full height of the blank as opposed to those of the blank of FIG. 24A, which extends approximately half the height of the blank. Because the blank is folded about the fold line F, the original length of the blank is twice that of the blank of FIG. 24A.

In an alternative embodiment, the combined spring 880 could be replaced by either a combined spring made from either of the alternative combined spring blanks 980 or 1080.

While some of the features in the actuator assemblies of FIGS. 1 to 25 have been described in relation to specific embodiments, it is to be appreciated that, where appropriate, most of the different features can be incorporated into the different embodiments.

More particularly, either a square or cylindrical spigot can be used in all of the embodiments, providing the spring inner arms are modified accordingly.

All of the embodiments using a first and second spiral return springs can be modified to have either pre-tension or no pre-tension in the neutral position.

The actuator assemblies described in FIGS. 1 to 25 can be used to drive a linkage connected to the gear wheel in the first and second direction. The actuator assemblies are arranged such that after being driven in the first or second direction, the gear wheel is returned to the neutral position under the action of the spiral return spring.

The linkage can be connected to a component of a device such that the component can be powered in first or second directions to first or second component positions. Typically, such devices also include manual means to move the component between the first and second component positions, both for convenience and in the event of power failure. After power actuating the component in the first or second direction, the fact that the actuator is returned to the neutral position means that if the manual means is used to move the component, it is not necessary to manually back drive the motor, thus less effort is required.

Figure 26:
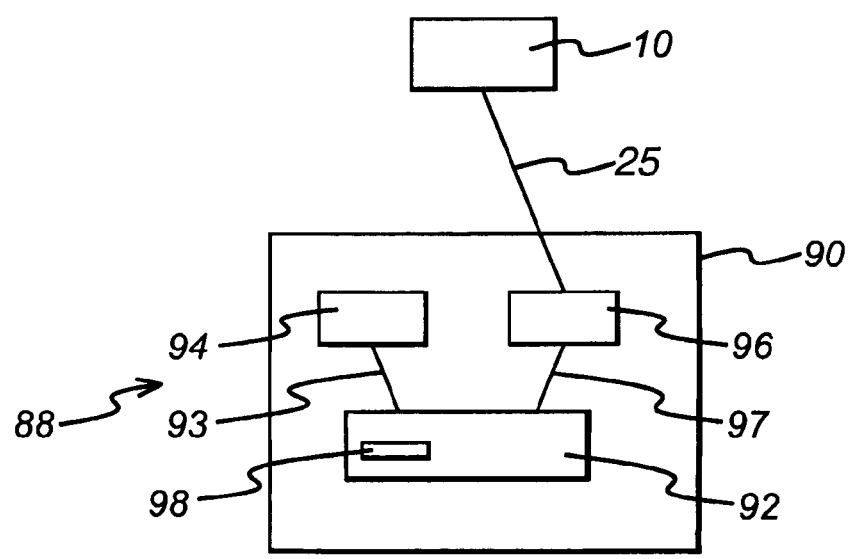
FIG. 26 is a schematic view of a latch assembly including an actuator assembly according to the present invention.

An example of a device that is powered in first and second directions is a powered locking latch. With reference to FIG. 26, a latch assembly 88 including a latch 90 and the actuator assembly 10 is shown. The latch assembly 88 is typically used on a land vehicle, such as a car or truck. The latch assembly 88 can be used to secure a driver or passenger door closed or it can be used to secure a trunk lid closed.

The latch 90 includes a locking mechanism 92 that is connected via a first linkage 93 to a manual locking feature 94 and via a second linkage 97 to a powered locking feature 96. The manual locking feature 94 is typically connected to one or more of a sill button (not shown, but typically mounted on an inside sill of a door), an inside release lever (not shown), and a key mechanism (not shown but typically mounted on the outside of a door). The locking mechanism 92 includes a lock link 98.

The actuator assembly 10 is connected to the powered locking feature 96 via the linkage 25 (FIG. 1) such that the electric motor 12 (FIG. 1) can drive the linkage 25 in first or second directions. Movement of the linkage 25 in the first direction from the neutral position A moves the lock link 98 to a first component position where the latch 90 is locked, and movement of the linkage 25 in the second direction from the neutral position A moves the lock link 98 to a second component position where the latch 90 is unlocked. In other embodiments, the component positions could correspond to, for example, child safety on and child safety off positions.

After the electric motor 12 has driven the lock link 98 to the locked position, the electric motor 12 is returned to the neutral position A by the bias of the spiral spring. The latch 90 can now be power unlocked by driving the electric motor 12 in the second (opposite direction), or manually unlocked via the manual locking means 94. Because the electric motor 12 is in the neutral position A, the manual locking means 94 does not have to manually back drive the electric motor 12, and therefore operation of the sill button, key, or inside release lever does not require the extra effort of having to manually back drive the electric motor 12.

Thus, it can be seen that by employing the actuator assembly 10 of the present invention in a powered locking latch, the electric motor 12 does not have to be back driven, be it manually or by operating the electric motor 12 in the opposite direction.

In other embodiments, the actuator assembly 10 could be replaced by any of the actuator assemblies of FIGS. 4 to 25.

In another embodiment, the gear wheel 16 could be directly connected to the locking mechanism 92, as opposed to via the linkage 25.

Although preferred embodiments of the present invention have been disclosed, a worker of ordinary skill in this art would recognize that certain modifications would come within the scope of this invention. For that reason, the following claims should be studied to determine the true scope and content of this invention.

The invention claimed is:

1. An actuator assembly comprising:
    an actuator;
    an output member having a neutral position, a first actuated position, and a second actuated position, wherein the neutral position is located between the first actuated position and the second actuated position, and wherein the output member is driveable by the actuator from the neutral position to the first actuated position and to the second actuated position; and
    a spring arrangement including at least one spiral return spring, wherein the spring arrangement is arranged to bias the output member towards the neutral position from the first actuated position and is arranged to bias the output member towards the neutral position from the second actuated position,
    wherein the at least one spiral return spring includes a first spiral return spring that biases the output member from the first actuated position towards the neutral position and a second spiral return spring that biases the output member from the second actuated position towards the neutral position, and
    wherein the first spiral return spring and the second spiral return spring are pre-tensioned in the neutral position.

2. The actuator assembly according to claim 1, wherein the first spiral return spring rotates in a first direction and the second spiral return spring rotates in a second direction opposite to the first direction.

3. The actuator assembly according to claim 1, wherein the first spiral return spring includes a first outer arm and a first inner arm, and the second spiral return spring includes a second outer arm and a second inner arm,
    wherein during actuation of the output member to the first actuated position, there is a relative movement between the first inner arm and the first outer arm of the first spiral return spring such that the first spiral return spring biases the output member towards the neutral points, and
    wherein there is no relative movement between the second inner arm and the second outer arm of the second spiral return spring.

4. The actuator assembly according to claim 3, wherein the first inner arm does not move and the first outer arm moves with the output member during actuation of the output member to the first actuated position.

5. The actuator assembly according to claim 3, wherein the first outer arm does not move and the first outer arm moves with the output member during actuation output member to the first actuated position.

6. The actuator assembly according to claim 3, wherein the second inner arm and the second outer arm move with the output member such that there is no relative movement between the second inner arm and the second outer arm during actuation of the output member.

7. The actuator assembly according to claim 3, wherein the second inner arm and the second outer arm do not move such that there is no relative movement between the second inner arm and the second outer arm during actuation of the output member.

8. The actuator assembly according to claim 3, further including a spigot having a slot, wherein the first inner arm and second inner arm are located in the slot.

9. The actuator assembly according to claim 8, further including a chassis, wherein the spigot is integral with the chassis and the output member is mounted to the chassis.

10. The actuator assembly according to claim 8, wherein the spigot has a substantially cylindrical cross-section.

11. The actuator assembly according to claim 8, wherein the spigot has a substantially square cross-section.

12. The actuator assembly according to claim 1, wherein the output member includes a first side and a second side, and wherein the first spiral return spring is mounted on the first side of the output member and the second spiral return spring is mounted on the second side of the output member.

13. The actuator assembly according to claim 1, wherein the spring arrangement is a combined spring including the first spiral return spring and the second spiral return spring, wherein the first spiral return spring and second spiral return spring are integral, and wherein the first spiral return spring rotates in a first direction and the second spiral return spring rotates in a second direction opposite the first direction.

14. The actuator assembly according to claim 1, wherein the output member is a gear wheel.

15. A latch assembly comprising:
    an actuator assembly including an actuator;
    an output member having a neutral position, a first actuated position, and a second actuated position, wherein the neutral position is located between the first actuated position and the second actuated position, and wherein the output member is driveable by the actuator from the neutral position to the first actuated position and to the second actuated position; and
    a spring arrangement including at least one spiral return spring, wherein the spring arrangement is arranged to bias the output member towards the neutral position from the first actuated position and to bias the output member towards the neutral position from the second actuated position, wherein the actuator is operable to move a component of the latch assembly between a first component position and a second component position to change a latch state,
    wherein the at least one spiral return spring includes a first spiral return spring that biases the output member from the first actuated position towards the neutral position and a second spiral return spring that biases the output member from the second actuated position towards the neutral position, and
    wherein the first spiral return spring and the second spiral return spring are pre-tensioned in the neutral position.

16. The latch assembly according to claim 15, wherein the first component position corresponds to a locked state of the latch assembly and the second component position corresponds to an unlocked state of the latch assembly.

* * * * *

UNITED STATES PATENT AND TRADEMARK OFFICE
CERTIFICATE OF CORRECTION

PATENT NO. : 7,128,191 B2 Page 1 of 1
APPLICATION NO. : 10/970694
DATED : October 31, 2006
INVENTOR(S) : Sidney Edward Fisher It is certified that error appears in the above-identified patent and that said Letters Patent is hereby corrected as shown below:

Column 15, line 54: "points" should be --point--

Column 15, line 63: 2nd Occurrence of "outer" should be --inner--

Column 15, line 64: After "actuation" insert --of the--

Signed and Sealed this

Twenty-third Day of January, 2007

JON W. DUDAS
*Director of the United States Patent and Trademark Office*